(12) United States Patent
Byron

(10) Patent No.: US 12,168,192 B2
(45) Date of Patent: Dec. 17, 2024

(54) SYSTEMS AND METHODS FOR FLUID MONITORING AND CONTENT CONTROL IN INDUSTRIAL FLUID SYSTEMS

(71) Applicant: James Arthur Byron, Ponte Vedra, FL (US)

(72) Inventor: James Arthur Byron, Ponte Vedra, FL (US)

(*) Notice: Subject to any disclaimer, the term of this patent is extended or adjusted under 35 U.S.C. 154(b) by 695 days.

(21) Appl. No.: 17/196,318

(22) Filed: Mar. 9, 2021

(65) Prior Publication Data

US 2021/0275949 A1   Sep. 9, 2021

Related U.S. Application Data

(60) Provisional application No. 62/987,234, filed on Mar. 9, 2020.

(51) Int. Cl.
*B01D 41/04* (2006.01)
*B01D 46/70* (2022.01)

(52) U.S. Cl.
CPC ............ *B01D 41/04* (2013.01); *B01D 46/70* (2022.01); *B01D 2201/085* (2013.01)

(58) Field of Classification Search
CPC .. B01D 24/00–4876; B01D 29/00–965; B01D 39/14; B01D 39/20; B01D 39/2003; B01D 39/2068; B01D 2239/0283; C02F 1/28; C02F 1/281; C02F 1/285; C02F 1/288; B01J 20/28014; B01J 20/28019; B01J 20/22; B01J 20/223
See application file for complete search history.

(56) References Cited

U.S. PATENT DOCUMENTS

| | | | | |
|---|---|---|---|---|
| 3,825,120 | A  * | 7/1974 | Takahashi | B01D 24/12 210/138 |
| 2011/0272358 | A1 * | 11/2011 | Crawford | B01D 53/0431 210/660 |
| 2015/0316474 | A1 * | 11/2015 | Phillips | B01D 25/12 210/745 |

* cited by examiner

*Primary Examiner* — Spencer E. Bell
(74) *Attorney, Agent, or Firm* — Wilson Dutra, PLLC; Camille A. Wilson

(57) ABSTRACT

The present disclosure provides an exemplary process for a system that may remove particulate from industrial water fluids using a Particulate Removal System (PRS). In some aspects, this system may treat water pulled from different Industrial Fluid Systems (IFS) while doing continuous monitoring and quality tests of the water. In some embodiments, the system may use sensors and other technology to allow for the system to periodically self-clean itself allowing for maximum efficiency and accuracy while also cleaning the water from the IFS. In some implementations, the water from the IFS may be filtered through a Particulate Trap Mechanism (PTM) to ensure that particulate including dissolved material has been removed from the water and separated from possible contamination throughout the system. In some aspects the system may be used for continuous and direct measurement of water quality and automatic chemical level adjustment by systems to maintain a desired range or setpoints.

14 Claims, 21 Drawing Sheets

SYSTEMS AND METHODS FOR FLUID MONITORING AND CONTENT CONTROL IN INDUSTRIAL FLUID SYSTEMS

CROSS REFERENCE TO RELATED APPLICATION

This application claims priority to and the full benefit of U.S. Provisional Patent Application Ser. No. 62/987,234, filed Mar. 9, 2020, and titled "SYSTEMS AND METHODS FOR FLUID MONITORING AND CONTENT CONTROL IN INDUSTRIAL FLUID SYSTEMS", the entire contents of which are incorporated in this application by reference.

BACKGROUND

Continuous Direct Measurement (CDM) of chemicals used in food processing systems is inhibited or made impossible by the presence of soluble and insoluble material in the system being monitored. In most food processing systems, the ideal goal is for chemicals to be added to water and automatically monitor and automatically control the level of chemicals in the water within a target range of chemical concentration. The presence of solid and dissolved or soluble material in the process water or liquid has embodied an impenetrable challenge preventing the use of chemical sensors to automatically continuously direct measure and control chemical levels in process waters and liquids.

The presence of solid and dissolved or soluble material in practice produces deposits on the surface of a probe or chemical sensor, interfering with accurate sensor function and preventing reliable automation of the automatic continuous measuring and control system. Without reliable chemical sensor probes or instruments, the food industry is required to perform manual sampling and manual chemical concentration measurement titrations on a periodic basis, usually once per hour, and use the chemical titration result to adjust chemical addition rate settings to "operate the process".

The legacy manual titration-control approach is inferior to an automated CDM technology that continuously monitors and continuously adjusts chemical to control chemical levels. Chemicals levels are measured by sensors or probes once every thirty seconds and proper chemical levels are automatically maintained continuously. Over several decades the poultry industry, working with chemical manufacturers, have unsuccessfully attempted to develop a method of automation for water treatment, particularly for poultry chillers. These have been relatively unsuccessful prior efforts to develop a reliable method that enables automated sensor control of chiller chemical levels.

Removal of solid and dissolved or soluble material from process water and liquids is a significant challenge in the food industry, in agriculture, and in other industries. Fats, oils, grease, blood, feathers, and solid material are especially challenging. Conventional filtration systems are ineffective because media and filters become fouled or blinded, quickly resulting in unacceptable economics and poor operational performance. The performance of conventional filtration and separation equipment are especially poor with fluids like poultry chiller water that contains both solid materials, such as fat, protein, blood, feathers, foam, and dissolved materials, such as fat and oil, suspended in water. Efforts to use real-time instrumentation and sensors or probes to monitor poultry chiller water chemical levels have been frustrated because of historically unreliable instrument and sensor performance as a result of probe or sensor fouling or loss of sample flow associated with material suspended in the water.

SUMMARY OF THE DISCLOSURE

What is needed is a system and method for particulate removal in Industrial Fluid Systems (IFS). In some embodiments, this may include a device that is dependable for extended periods of use, operating continuously for a week or several weeks without service to produce water or liquid of a quality. In some implementations, a system and method may accurately measure chemical levels using electronic chemical sensors or probes. In some aspects, the system and method enables automation of process control to replace the manual sample, manual titrate and manual adjust requirement for chemical control historically and currently used within the poultry industry and other food production environments. In some embodiments, the system and method facilitates CDM of process liquid and control the process effectively using automatic sensors or probes to control chemical addition.

One general aspect may comprise a particulate removal system for continuous fluid sampling in industrial fluid systems. In some embodiments, the particulate removal system may further may comprise a receiving end configured to receive fluid from an industrial fluid system; a plurality of sensors, where each of the plurality of sensors may be configured to monitor a predefined attribute of fluid received from the industrial fluid system when fluid may be flowed in contact with each of the plurality of sensors; at least one fluid actuator controlling flow of fluid from the industrial fluid system to the particulate removal system; an outflow end to expel fluid flowed through the particulate removal system; and a controller in logical communication with one or more of the plurality of sensors and the at least one fluid actuator, where the controller controls a position of the at least one fluid actuator.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods.

In some embodiments, the system may include a particulate trap mechanism located between the industrial fluid system and the system for fluid monitoring, where the particulate trap mechanism removes particulate from fluid. In some implementations, dispensing may be based on predefined threshold parameters of at least a portion of predefined attributes monitored by the plurality of sensors. In some aspects, the chemical control system may maintain fluid within predefined parameters of at least a portion of predefined attributes monitored by the plurality of sensors. In some embodiments, fluid sampling data may be displayed through the control panel. In some implementations, fluid sampling data may be displayed wirelessly to an external device.

In some aspects, the cleaning system may comprise at least one quill configured to dispense fluid across at least a portion of the plurality of sensors during a cleaning cycle. In some embodiments, the controller triggers at least one actuator to stop flow of the fluid from the industrial fluid system to the particulate removal system during the cleaning cycle. In some implementations, at least a portion of the plurality of sensors may be configured to monitor accumulation of particulate on the portion of the plurality of sensors, where detection of a threshold accumulation level initiates the cleaning cycle. In some embodiments, implementations of the described techniques may include hardware, a method or process, or computer software on a computer-accessible medium.

In some implementations, the system may include a particulate removal system for continuous fluid sampling in industrial fluid systems a pipe system connected to an industrial fluid system, where the pipe system continuously receives fluid from the industrial fluid system, and where the pipe system may comprise a plurality of sensors, where each of the plurality of sensors may be configured to monitor a predefined attribute of the fluid received from the industrial fluid system when the fluid may be flowed in contact with each of the plurality of sensors; at least one fluid actuator controlling flow of the fluid from the industrial fluid system to the pipe system; and an outflow end to expel fluid flowed through the pipe system. In some aspects, the system may include corresponding computer systems, apparatus, and computer programs recorded on one or more computer storage devices, each configured to perform the actions of the methods.

In some embodiments, the particulate removal system where the outflow end may be a terminating end for the flow of fluid. In some implementations, dispensing may be based on predefined threshold parameters of at least a portion of predefined attributes monitored by the plurality of sensors. In some aspects, the cleaning system may comprise at least one quill configured to dispense fluid across at least a portion of the plurality of sensors during a cleaning cycle.

In some embodiments, the cleaning system further may comprise a reservoir providing cleaning fluid to the at least one quill. In some implementations, at least one actuator may stop flow of the fluid from the industrial fluid system to the particulate removal system during the cleaning cycle. In some aspects, at least a portion of the plurality of sensors may be configured to monitor accumulation of particulate on the portion of the plurality of sensors, where detection of a threshold accumulation level initiates the cleaning cycle.

In some embodiments, a particulate trap mechanism may comprise a particulate removing media; a containing portion configured to contain the particulate removing media, a fluid intake connector configured to accept fluid from an industrial fluid system into the containing portion and through the particulate removing media, and a fluid outflow connector configured to dispense clean fluid from the containing portion to a continuous direct measurement system.

In some implementations, the particulate trap mechanism may include a particulate sensor, where the particulate sensor may be configured to detect a level of particulate build up within the particulate removing media. In some aspects, the particulate trap mechanism of may be configured to remove one or more particulate, dissolved solids, or soluble material from the fluid. In some embodiments, removal may occur when the one or more particulate, dissolved solids, or soluble materials collides with the particulate removing media.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

Figure 1:
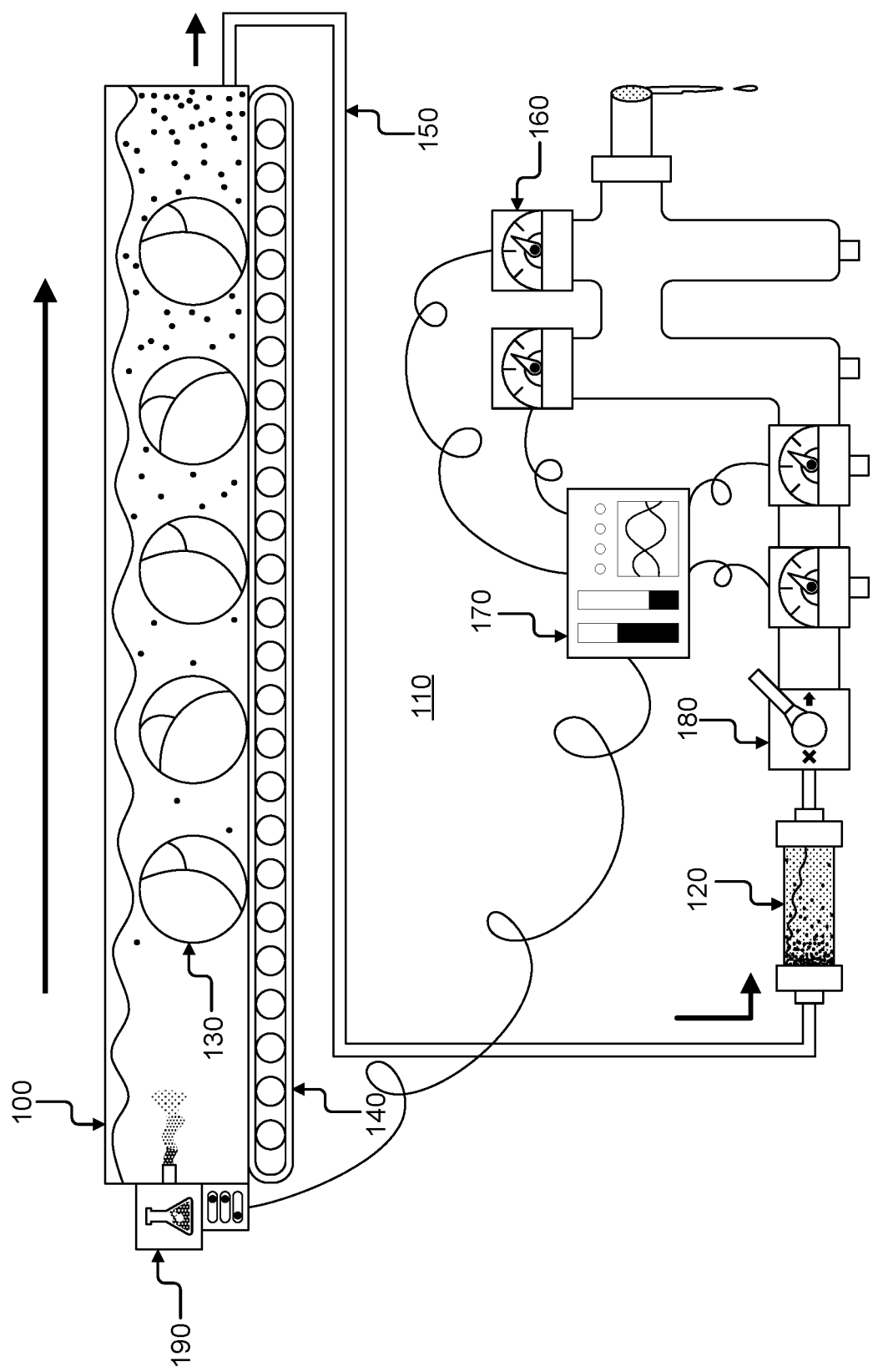
FIG. 1 illustrates an industrial fluid system with exemplary particulate removal system for continuous fluid sampling, according to some embodiments of the present disclosure.

The present disclosure provides generally for a system that may remove particulate from Industrial Fluid Systems (IFS). According to the present disclosure, the system may provide a Particulate Removal System (PRS) through which particulate may be filtered out of liquid from an IFS. In some implementations, the particulate may be filtered from fluid from an IFS, which may limit adhesion of particulate to sensitive equipment, such as sensors for fluid quality testing. Excessive particulate may limit the functionality of sensitive equipment within an IFS.

In some aspects, a PRS may perform self-cleaning cycles to limit the need for manual operation or maintenance of the PRS. In some implementations, this may occur periodically to ensure the components in the PRS maintain accuracy, effectiveness, and efficiency. In some embodiments, the system may include a Particulate Trap Mechanism (PTM), which may help filter the particulate out of the water and keep it separate from one or both a PRS and IFS. In some implementations, a PTM may comprise different types of media for different types of IFS and particulate being filtered out of the system.

In some aspects, the Particulate Removal System (PRS) may help remove particulate from the fluid of the IFS, wherein the clean fluid may be flowed back into the IFS. In some implementations, sample fluid may be removed from an IFS and flowed through a PRS to allow for continuous monitoring of fluid quality. In some embodiments, a PRS may use sensors and monitoring equipment to test the fluid from an IFS based on predefined quality parameters. For example, for poultry processing, regulations require water from a chiller to fall within an acceptable chemistry range, such as the level of peracetic acid, ASC (acidified sodium chlorite), or another chemical, which may limit the risk of *Salmonella*. In some implementations, a PRS may receive notifications about all ongoing processes and updates via a control panel that may be fully accessible by the user.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Particulate Removal System (PRS): as used herein refers to a system that removes particulate from an industrial fluid system through use of a PTM. In some embodiments, a PRS may be integrated with an industrial fluid system, such as for continuous fluid sampling or fluid maintenance.

Particulate Trap Mechanism (PTM): as used herein refers to a mechanism that traps particulate as fluid passes through the PTM.

Industrial Fluid System (IFS): as used herein refers to an industrial system that is dependent on fluid. In some embodiments, an IFS may comprise a water chiller system or dip tank, such as used in poultry processing, meat processing, or commercial food preparation, as non-limiting examples. In some implementations, an IFS may comprise a rinsing or cleaning system, such as for cleaning produce. In some aspects, an IFS may comprise a conveyor system for delicate items, wherein fluid may limit risk of damage, such as for easily bruised produce. In some embodiments, an IFS may comprise a petroleum system.

Referring now to FIG. 1, an industrial fluid system (IFS) 100 with exemplary particulate removal system (PRS) 110 for continuous fluid sampling is illustrated. In some embodiments, an IFS 100 with a PRS 110 may be used for continuous fluid sampling throughout the process. In some aspects, a product 130 may be placed onto a conveyance system conveyor belt 140 within an IFS 100, such as may be used with produce processing and poultry chilling. In some implementations, a portion of fluid from the IFS 100 may be flowed through a sampling pipe 150.

In some aspects, the IFS 100 may be part of a cold chain and may regulate processing temperature for a product, such as sauces, poultry, agricultural produce, seafood, chemicals, and pharmaceutical drugs, as non-limiting examples. In some embodiments, the IFS 100 may comprise a chiller that may cool specific products based on predefined parameters. For example, once eviscerated, poultry may need to be chilled to a specific temperature to limit the risk of contamination by bacteria. As another example, some products may be cooked or heated during the manufacturing process and may need to be cooled for transportation and safe maintenance.

In some embodiments, the sampling pipe 150 may draw a limited stream of fluid from the IFS 100, such as may be necessary to adequately assess the quality of the fluid. In some implementations, automatic addition of chemicals may be added to maintain the range within the IFS 100. For example, caustic, acid, or other material may be added to maintain a predefined pH setpoint, which may allow for the maintenance of peracetic acid, ASC (acidified sodium chlorite), or another chemical level, range, or setpoint required by the system while also maintaining the range of the system. In some aspects, the sampling pipe 150 may be accessed by a user, which may allow a user to manually draw fluid to support the findings of the sensors 160 within a PRS 110. In some implementations, the fluid may need to be treated based on the test results or observation by the user or the PRS 110. In some aspects, a PRS 110 may allow for direct additives for testing purposes without affecting the overall quality of the fluid in the IFS 100. For example, dyes or chemicals may be used to prepare fluid for sensors 160.

In some embodiments, the sensors 160 may notify the system and the user when particulate or unwanted chemistry is detected. For example, the sensors 160 may indicate where the particulate or unwanted chemistry may be throughout the PRS, which may allow a user to address the issue. In some aspects, particulate may include but are not limited to blood, fat, excess product, soluble material, or solids of any kind, whether dissolved or not. In some embodiments, the sensors 160 may also indicate when the IFS or PRS may be out of compliance, which may occur if particulate adheres to a sensor 160 or peracetic acid, ASC (acidified sodium chlorite), or another chemical levels fall outside an acceptable range. In some embodiments, the sensor 160 may notify the PRS 110 of the issue.

In some implementations, the PRS 110 may integrate the technology of the sensors 160 into the system allowing for continuous liquid flow monitoring. In some embodiments, the PRS 110 may self-clean to regulate the clean water running through the system and ensure that the system runs as smooth and efficient as possible. In some implementations, the PRS 110 may flow water through a Particulate Trap Mechanism (PTM) 120 to help keep the system clean. In some embodiments, the PRS 110 may use a separate water source to flush in water to the system that cleans the sensors 160 and flushes out any unwanted particulate from the system.

In some embodiments, the PTM 120 may act as a filter for all the unwanted particulate that circulates throughout the system. In some implementations, the PTM 120 may become filled with unwanted particulate, and once full it may notify the system and a user may flush the PTM 120 or change the media. In some aspects, the PTM 120 may have a fluid forced through it to empty the particulate out of the system, or there may be a specific fluid used to dissolve everything in the PTM 120. In some embodiments, the PTM 120 may be filled with media, which may include, but is not limited to, porous rocks, scrubbers, or bristles. In some implementations, media may be used to help slow down the velocity of the water flow and cause a change in direction, cause a collision or colliding of solids, soluble materials, or particulate with media, separating the solids, soluble materials, or unwanted particulate from the fluid.

In some aspects, the PTM 120 may allow for clean water to flow out of the mechanism while keeping all the particulate in the trap. In some implementations, the PTM 120 may be cleaned out manually when the system is notified of it being filled. In some implementations, once the PTM 120 is filled it may notify the system and the system may notify the user to empty the PTM 120. In some aspects, the PTM 120 may be emptied when the system is turned off and it is safe for the user to empty the unwanted particulate out of the mechanism. In some embodiments, the system may clean the PTM 120 periodically when it senses the mechanism is becoming full. For example, the system may have a separate compartment where unwanted particulate can be automatically transferred from the PTM 120.

In some implementations, the PTM 120 may help break down larger solids, soluble materials, or particulate in the water stream. In some aspects, the media in the PTM 120 may be disconnected from the mechanism and cleaned out manually to prevent from equipment failure or possible permanent damage to the media. In some embodiments, there may exist a fluid actuator 180 may be used to control the flow of the fluid in the system. In some implementations, the fluid actuator 180 may stop the fluid from flowing throughout the system when the PTM 120 is being cleaned or the system is being treated. In some aspects, the fluid actuator 180 may be adjusted to a certain flow level for specific times in the system. For example, the fluid actuator 180 may be closed partially to slow the flow down for more tests by the system and it may be reopened when the system is done being treated.

In some implementations, the controller 170 may be used to control all or some aspects of one or both the PRS and IFS. In some embodiments, the controller 170 may be used to control the flow of the water or fluid in the system, the conveyance system conveyor belt, the fluid actuator, the sensors, the PTM 120, the PRS 110 and the IFS 100. In some implementations, the controller 170 may be used to turn the entire system on and off or reset the system when it malfunctions. In some embodiments, the controller 170 may be programmed to do specific things to the system by the user. For example, the user may program the controller 170 to automatically treat the system once a week at a specific time, however, this may not be the only limiting example.

In some aspects, a chemical control system 190 may be used for quality control of the fluid throughout the system. In some implementations, the system may be notified that a fluid quality may be out of an acceptable range or compliance level, which may trigger a chemical control system 190 that may add chemistry to the fluid to adjust levels. For example, the fluid may become tainted or may be too caustic, and the sensors 160 may notify the control panel 170. The notification may trigger the chemical control system 190 to disperse the chemical contents into the system and into the stream of the fluid. In some embodiments, the chemical control system 190 may contain different chemicals based on the use of the fluid in the system.

In some aspects, a user may fill the chemical control system 190 with any chemical they choose that helps their system. In some implementations, the chemical control system 190 may be connected with a chemistry supply system that may be able to provide a variety of chemicals that may be useful to adjust monitored fluid qualities. For example, chemicals that may adjust pH may be supplied where pH is monitored.

In some embodiments, the chemical control system 190 may be attached to the IFS 100 and connected to the control panel 170, which may allow for direct communication between the PRS 110 and the chemical control system 190. In some implementations, the connection to the control panel 170 may be wired to an individual port so that the chemical control system 190 may be controlled from the control panel 170 rather than being controlled individually. In some embodiments, the chemical control system 190 may control the chemistry levels of the chiller fluid without using the sensor 160 data. For example, the control panel 170 may be set up to where the chemical control system 190 automatically disperses chemicals throughout the system on a timed basis for the chiller fluid.

Figure 2:
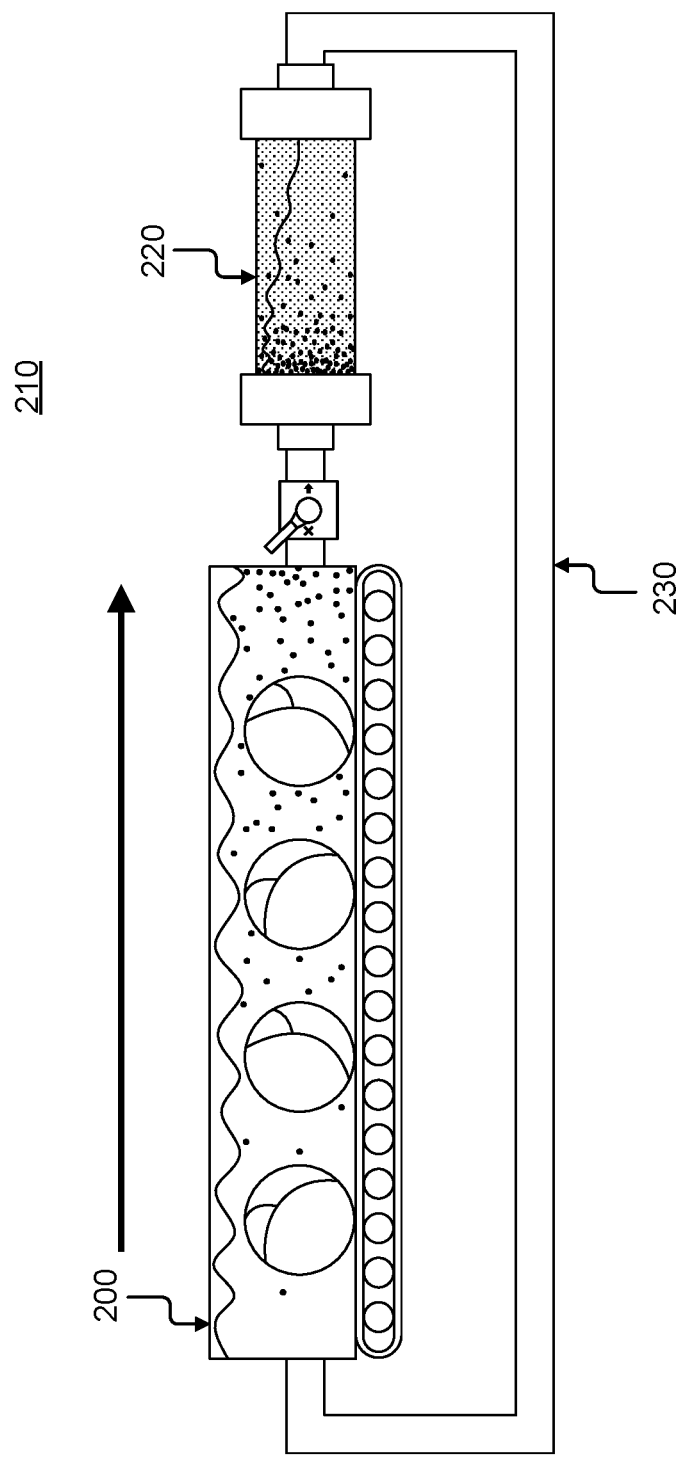
FIG. 2 illustrates an industrial fluid system with exemplary particulate removal system for fluid maintenance, according to some embodiments of the present disclosure.

Referring now to FIG. 2, an IFS 200 with a particulate removal system in which the particulate may be removed when fluid maintenance is being performed. In some embodiments, the water may flow from the IFS 200 directly into the PTM 220 where the fluid may be cleaned. In some aspects, the system may have automatic addition of chemicals to the system to maintain the range and pH levels of the chiller fluid throughout its cycle through the system. In some implementations, the fluid may be flowed through the PTM 220 so that the mechanism may filter the particulate out of the water using the media described in FIG. 1.

Figure 4:
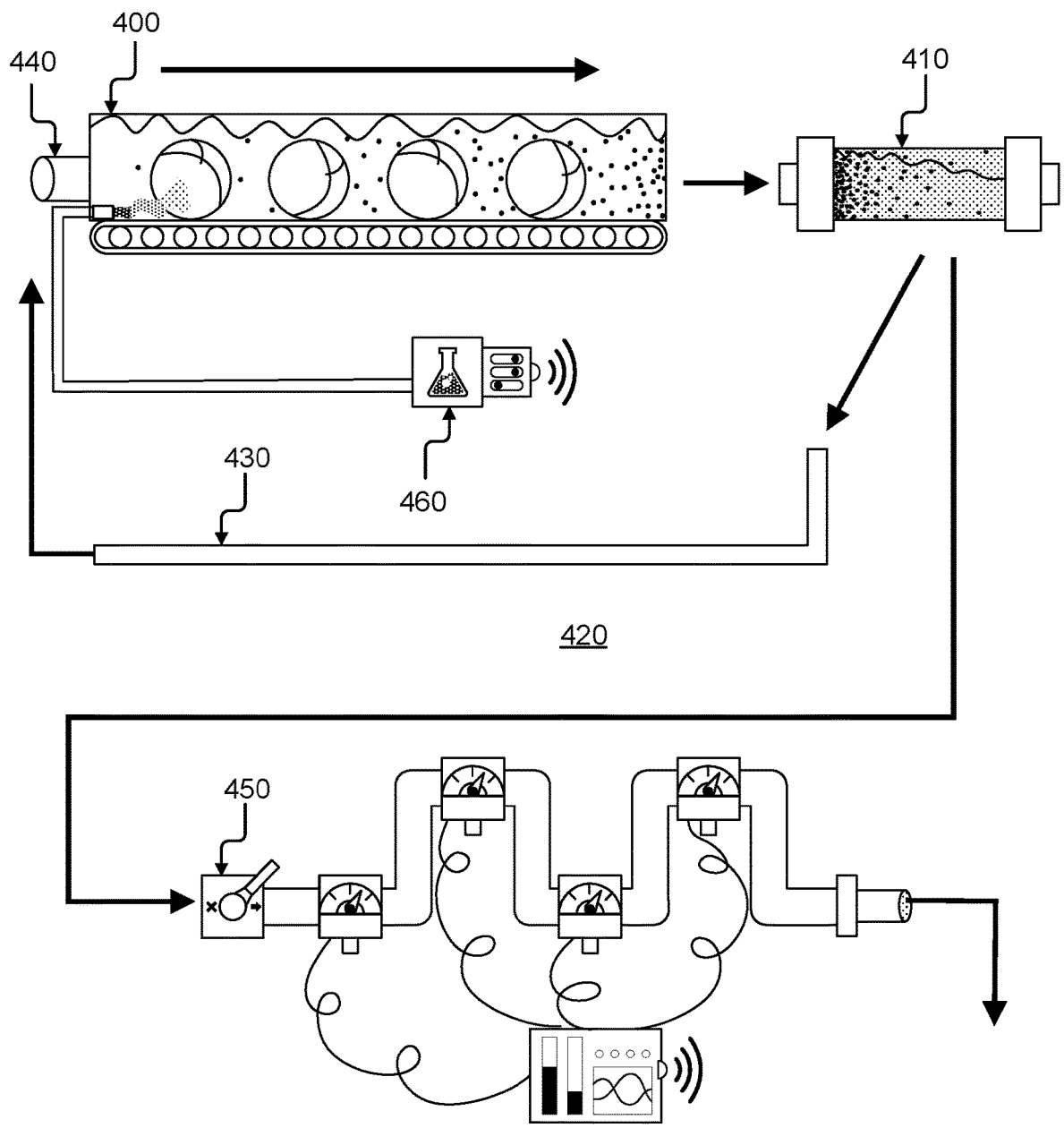
FIG. 4 illustrates an industrial fluid system with exemplary particulate removal system for continuous fluid sampling and fluid maintenance, according to some embodiments of the present disclosure.

In some implementations, the fluid may be recirculated through a PTM 220 for multiple pass throughs, which may increase the amount of particulate removed from the fluid. In some aspects, the number of pass throughs may depend on particulate levels. For example, for low amounts of particulate, the fluid may not require a deep cleansing. In some embodiments, the circulation may be dynamic and adjust in real time based on sensor data, such as illustrated in FIGS. 1 and 4.

In some implementations, once the fluid flows through the PTM 220 it may go through the maintenance pipe 230 back into the IFS 200. In some embodiments, the maintenance pipe 230 may have sensors or some indication method in which it may notify the system that the water may not have been properly cleaned. In some implementations, the maintenance pipe 230 may have valves on each end which may open and close on command stopping the fluid inside the pipe. For example, if the fluid is detected as contaminated the valves may be closed to prevent the contaminated water from reentering the IFS 200.

In some embodiments, the valve system as previously mentioned may also aid in pushing the fluid through the PTM 220. In some aspects, the system may automatically add chemicals to maintain a predefined range and pH levels of the chiller fluid throughout the system. In some implementations, the velocity in which the fluid travels may dictate on how well the fluid is cleaned and what media is used on the fluid to clean it. In some embodiments, different velocities of the fluid may be more effective in some circumstances than others. For example, the velocity may be based on levels of particulate, types of particulate, types of fluid, industry standards, IFS type, PRS types, PTM media, or PTM. In some implementations, the velocity of the fluid may help keep the fluid clean for longer periods of time, avoiding the constant cleaning of the fluid.

In some embodiments, different sensor types may help determine the velocity of the fluid in different areas of the system, which may enable the system to effectively regulate and monitor that the fluid flows within a predefined velocity range for the system to perform correctly. For example, a sensor may require a predefined contact duration to provide accurate results, and too high of a velocity may prevent an effective reading. In some embodiments, the sensor may regularly monitor the velocity of the fluid and ensure that it maintains the appropriate velocity for the system, and if the fluid were to flow outside the acceptable velocity range the adequate velocity, the sensor data may be sent to the control panel of the system, allowing for real time adjustment. In some embodiments, the control of chemical levels may be monitored by the CDM and remove particulate from fluid and continuously work to maintain qualities to a setpoint.

Figure 3:
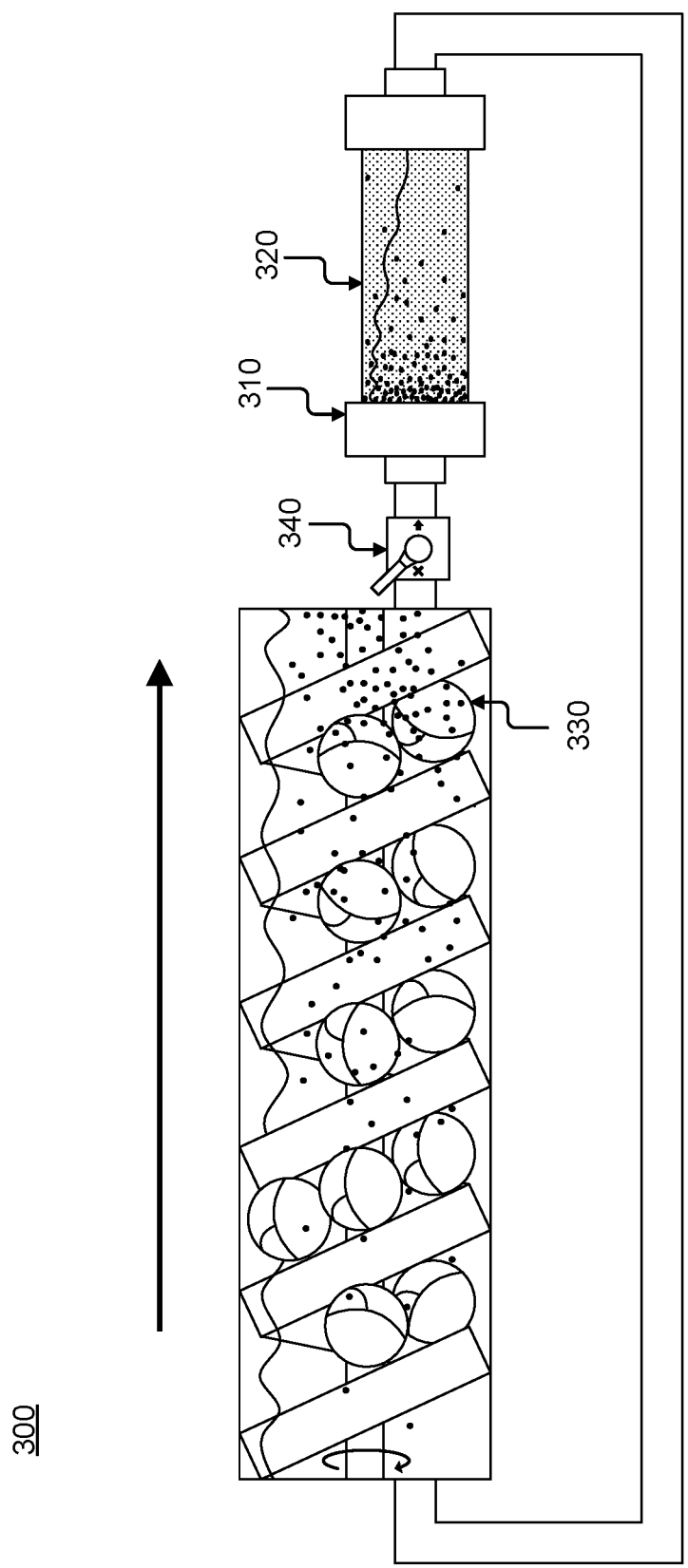
FIG. 3 illustrates an industrial fluid system with exemplary particulate removal system for fluid maintenance, according to some embodiments of the present disclosure.

Referring now to FIG. 3, an exemplary IFS 300 is illustrated. In some implementations, the IFS 300 may comprise a screw mechanism in the center of the IFS 300. In some embodiments, the IFS 300 may comprise a hollow center with threads, slats, or discs that allow for product 330 to be screwed into the device. In some aspects, a bar-like mechanism may comprise threads, slats, or discs on the outside that is retained in the center of the IFS 300. In some embodiments, the walls of the IFS may comprise extruded threads, slats, or discs to facilitate unidirectional motion of the product 330.

In some implementations, a fluid actuator 340 may regulate fluid flow within the IFS 300. In some aspects, fluid from the IFS 300 may pass through the PRS 310. In some embodiments, the PRS 310 may comprise a PTM 320.

In some embodiments, the PRS 310 may be utilized for continuous fluid sampling in the IFS 300. In some implementations, the PRS 310 may comprise a receiving end configured to receive fluid from an IFS 300. In some aspects, the PRS 310 may comprise a controller. In some embodiments, the PRS 310 may comprise a sensor. In some implementations, the PRS 310 may comprise a control panel. In some aspects, the PRS 310 may comprise one or more fluid actuators 340. In some implementations, the PRS 310 may comprise fluid sampling.

In some embodiments, the PRS 310 may comprise a pipe system connected to an IFS 300 wherein the pipe system continuously receives fluid from the IFS 300. In some implementations, the pipe system may comprise a plurality of sensors, wherein each of the plurality of sensors is configured to monitor a predefined attribute of the fluid received from the IFS 300 when the fluid is flowed in contact with each of the plurality of sensors. In some aspects, the pipe system may comprise a at least one fluid actuator 340 controlling flow of the fluid from the IFS 300 to the pipe system. In some embodiments, the pipe system may comprise an outflow end to expel fluid flowed through the pipe system.

In some implementations, a PTM 320 may comprise a particulate removing media. In some aspects, a PTM 320 may comprise a containing portion configured to contain the particulate removing media. In some embodiments, a PTM 320 may comprise a fluid intake connector configured to accept fluid from an IFS 300 into the containing portion and through the particulate removing media. In some implementations, a PTM 320 may comprise a fluid outflow connector configured to dispense clean fluid from the containing portion to a continuous direct measurement system.

In some implementations, product 330 may be pushed in between the threads, slats, or discs of the IFS 300. In some aspects, different attachments may supplement the functionality of the IFS 300. For example, a filtration system may be used to enhance the flow stream of the IFS 300. In some aspects, the attachment may comprise a switch that turns the attachment on and off. For example, the attachment may comprise a switch that opens and closes the liquid flow from the IFS 300 to the attachment.

Referring now to FIG. 4, an industrial fluid system 400 with exemplary particulate removal system 420 for continuous fluid sampling 450 and fluid maintenance 430 is illustrated. In some implementations, the PTM 410 may comprise a sensor or monitoring portion where the fluid flows through for testing, and only a small portion of the fluid is removed to monitor quality or to ensure it has not been contaminated. In some implementations, a small portion of fluid may be removed at various locations throughout the IFS to enable continuous fluid sampling to occur throughout the system. In some aspects, if the PRS 420 detects that the fluid has been cleaned or uncontaminated it may directly flow back into the IFS.

In some implementations, a PRS 420 may be constantly working to test and remove particulate from the fluid and continuously working to maintain chemical qualities of the fluid based on predefined criteria. In some aspects, the PRS 420 may allow for a responsive treatment of the fluid that may directly adjust chemistry levels based on sensor data, such as by adding chemicals to the fluid. In some embodiments, a PRS 420 may comprise a PRS alert status which may notify the system and the user of various issues that may occur. In some implementations, the PRS alert status may notify the user when the system is malfunctioning. In some aspects, the PRS alert status may automatically shut the system off when an issue occurs. In some embodiments, the PRS alert status may notify the system when sensors have malfunctioned or are rendered ineffective, such as by collecting particulate.

In some implementations, the PRS alert status 430 may trigger a regularly scheduled cleaning that may be programmed into the system manually. In some implementations, the PRS alert status may comprise sensors in which the system may possess the ability to sense when the system needs to be cleaned. In some embodiments, the PRS alert status may notify the system when the fluid coming out of the PTM 410 is too dirty or has been contaminated. This may trigger the system to close off the fluid from the PTM 410 and clean the mechanism before the fluid can proceed through the system. In some embodiments, it may notify the system that the PTM 410 is not working properly and needs maintenance or needs to be replaced because of a malfunction.

In some embodiments, the PRS 420 may operate autonomously. In some implementations, the PRS 420 may store data about typical fluid cycles and chemical levels, as non-limiting examples of fluid attributes. In some aspects, the PRS 420 may utilize machine learning to automatically adjust fluid attributes during use. In some embodiments, the PRS 420 may detect when the fluid exceeds predefined thresholds and automatically brings the IFS within the threshold tolerance levels. In some implementations, the PRS 420 may monitor predetermined thresholds continuously during use of the IFS and activate automated protocol when thresholds are exceeded.

As an illustrative example, the PRS may notice the salinity of the IFS is too high, the sensors are giving levels that exceed accuracy tolerance levels, and the medium in the PTM 410 is saturated with byproduct from the IFS. The PRS 420 may calculate the required fluid level reduction to ensure that fresh water lowers salinity levels to meet the predefined threshold. The PRS 420 may utilize an internal cleaning system to improve sensor accuracy. The PRS 420 may repeat the cleaning cycle when the readings continue to display inaccuracies exceeding predetermined tolerances. The PRS 420 may activate a fluid actuator to reduce flow through the PTM 410 sufficient to use mechanical automation to replace the saturated PTM 410 medium.

In some implementations, the PRS alert status may notify the system of any malfunction throughout each individual section of the system. In some aspects, the system may autocorrect the identified mistakes or it may notify the user that the issue may need further manual maintenance. For example, the PRS alert status may possess the ability to fix an internal issue that is occurring with the PTM 410, however, in some instances if the PTM 410 needs to be replaced the user may be notified and prompted to replace the mechanism.

In some embodiments, a chemical control system 460 may be controlled by the control panel through a wireless connection. In some aspects, the chemical control system 460 may be used to control the chemistry levels of the chiller fluid throughout the system. In some aspects, the wireless connection may allow for the chemical control system 460 to be a separate device, which may control the fluid by flowing adjusting chemicals through the tubing into the IFS. In some embodiments, the control panel may be programmed to automate the chemical control system 460 to disperse chemicals throughout the system.

In some aspects, the sensors of the system may provide data to the control panel notifying the chemical control system 460 to disperse chemicals to stabilize the chiller fluid throughout the system. In some implementations, the chemical control system 460 may be filled with different chemicals based on the systems' chiller fluid, the preference of the user, or the IFS. For example, different IFS may require different chemistry levels of fluid, and based on the predefined criteria for a particular IFS, the chemical control system 460 may provide relevant adjusting chemicals for the disbursement into the system when required.

Figure 5:
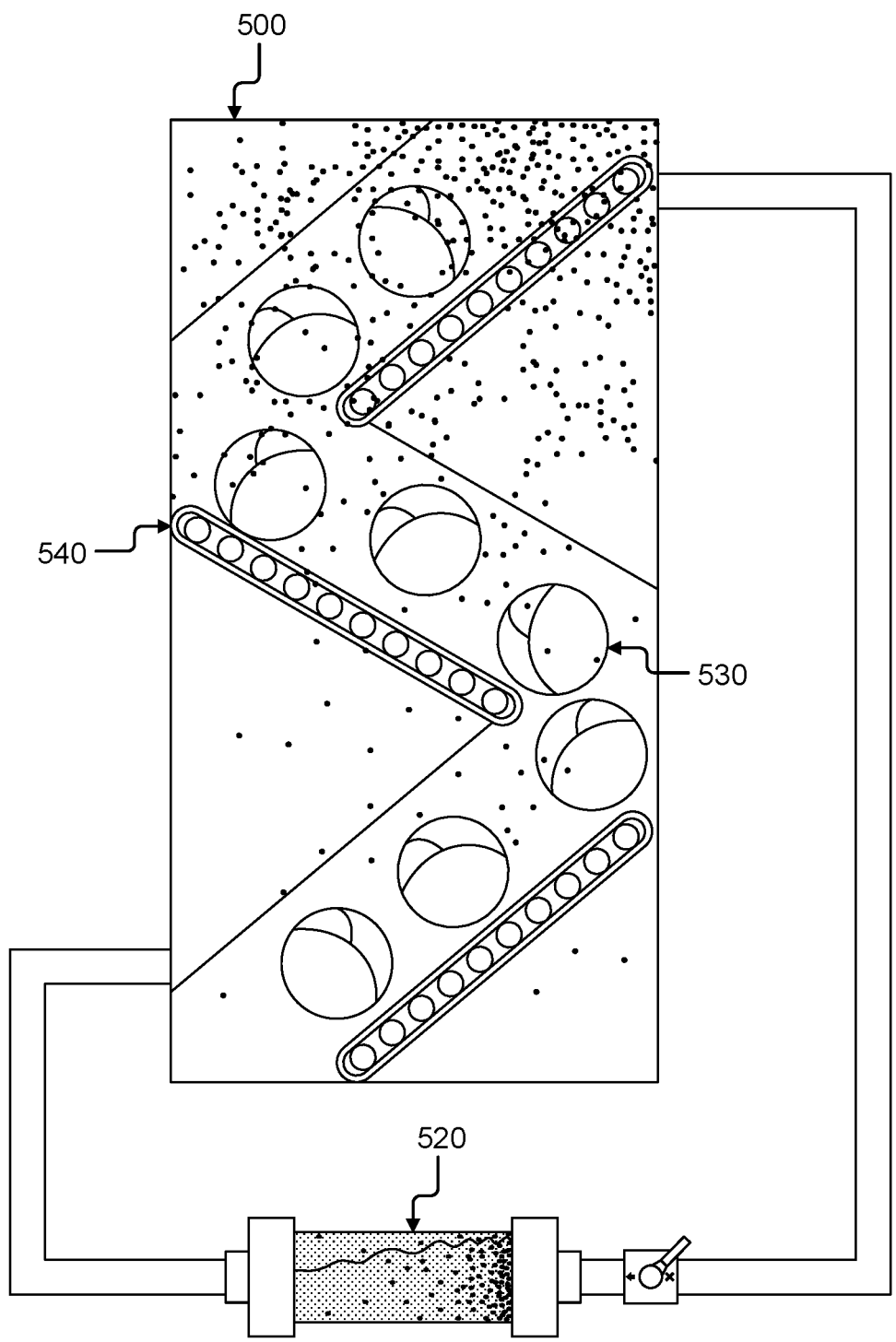
FIG. 5 illustrates an industrial fluid system with exemplary particulate removal system for fluid maintenance, according to some embodiments of the present disclosure.

Referring now to FIG. 5, an exemplary IFS 500 may comprise conveyance system conveyor belts 540 within the device. In some aspects, the conveyance system conveyor belts 540 may transport product 530 through the IFS 500. In some implementations, the conveyance system conveyor belts 540 may comprise a material that allows unidirectional flow of product 530 within the device. In some embodiments, the walls of the IFS 500 may guide the product 530 along the conveyance system conveyor belts 540 through the IFS 500. In some implementations, the inside of the conveyance system conveyor belts 540 may comprise thin walls to facilitate unidirectional movement of product 530 within the IFS 500.

In some aspects, the PTM 520 may be filled with a fluid while product 530 passes through the IFS 500. In some implementations, the walls around the conveyance system conveyor belts 540 may connect, enclosing the product 530 inside. In some aspects, the conveyance system conveyor belts 540 may have the ability to switch directions. For example, a button may be pressed and the conveyance system conveyor belt 540 begins moving in an alternate direction. In some implementations, conveyance system conveyor belts 540 may continue to operate when attachments are placed inside or on the IFS 500.

Figure 6:
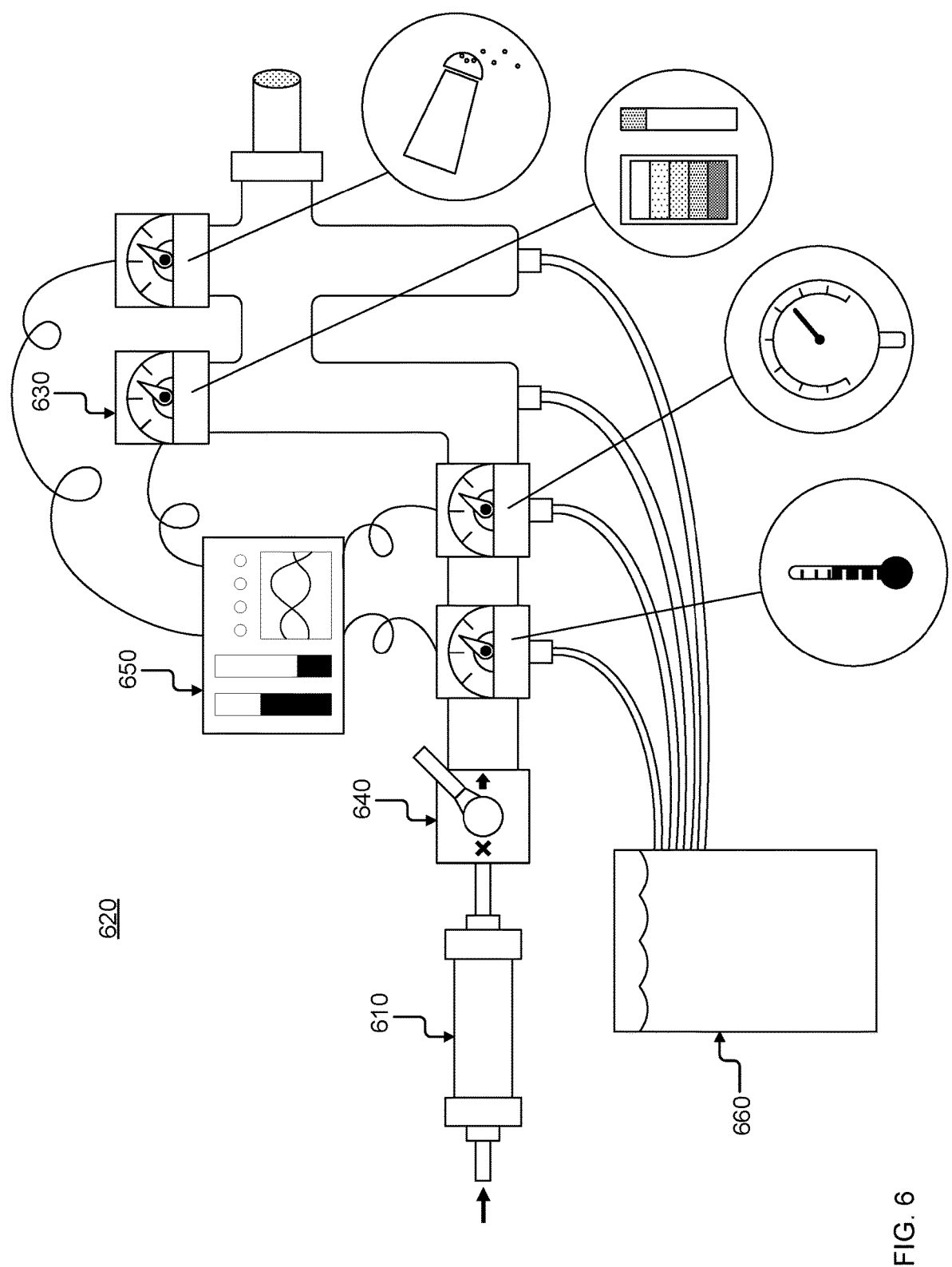
FIG. 6 illustrates an exemplary particulate removal system, according to some embodiments of the present disclosure.

Referring now to FIG. 6, an exemplary particulate removal system 620 is illustrated. In some aspects, the PTM 610 may be located before the fluid actuator 640. In some implementations, the fluid actuator 640 may regulate the fluid appropriately throughout the system as needed by the system and the product being created or used on the IFS 600. In some implementations, the PTM 610 may be directly connected to the fluid actuator 640. In some embodiments, the PTM 610 may be located after a fluid actuator 640, which may allow for a cut off of fluid to the PTM 610.

In some implementations, the PRS 620 may comprise a self-cleaning feature in which the system is prompted to do a full internal cleaning of the system. In some implementations, the system may be programmed to automatically clean itself at certain scheduled periods. For example, the system may be programmed to self-clean once every week on a Wednesday or every eight hours.

The frequency and duration of a clean cycle may depend on a range of factors, such as the type of fluid, the type of particulate, the PRS 620, the IFS, or industry standards, as non-limiting examples. For example, if clogging may occur within the PRS 620 within five hours because the particulate comprises a thick or sticky substance, such as fat or oils, the clean cycle may occur every four hours to limit build up. In some aspects, the PRS 620 may comprise sensors throughout the system in which may detect when the system is dirty and automatically run a full cleaning cycle through the system. For example, the system may sense that two or more sensors are dirty, and this may trigger an auto clean, however, this may not be the only limiting example.

Figure 9A:
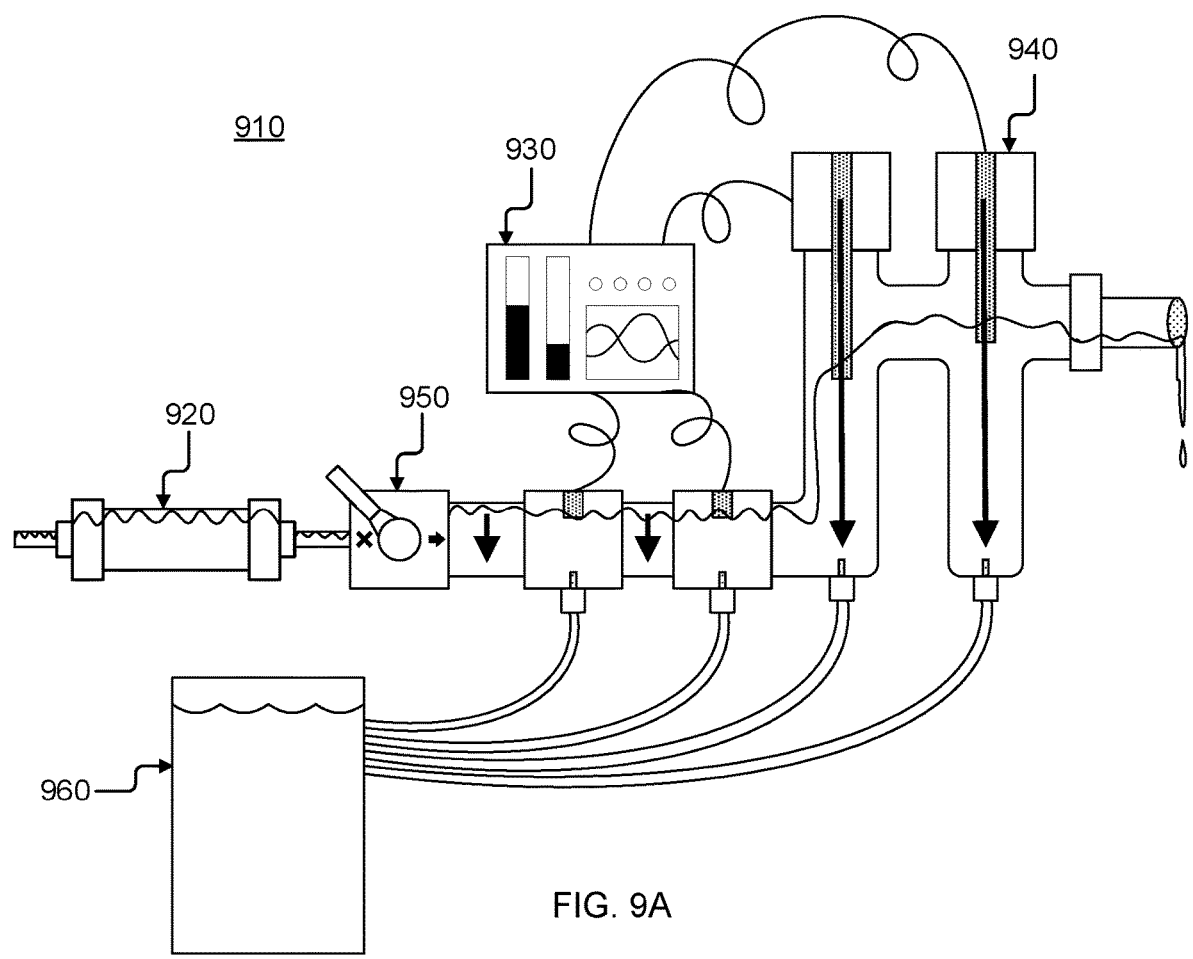
FIG. 9A illustrates an exemplary particulate removal system with self-cleaning features, wherein the particulate removal system is in a filter cycle, according to some embodiments of the present disclosure.
Figure 9B:
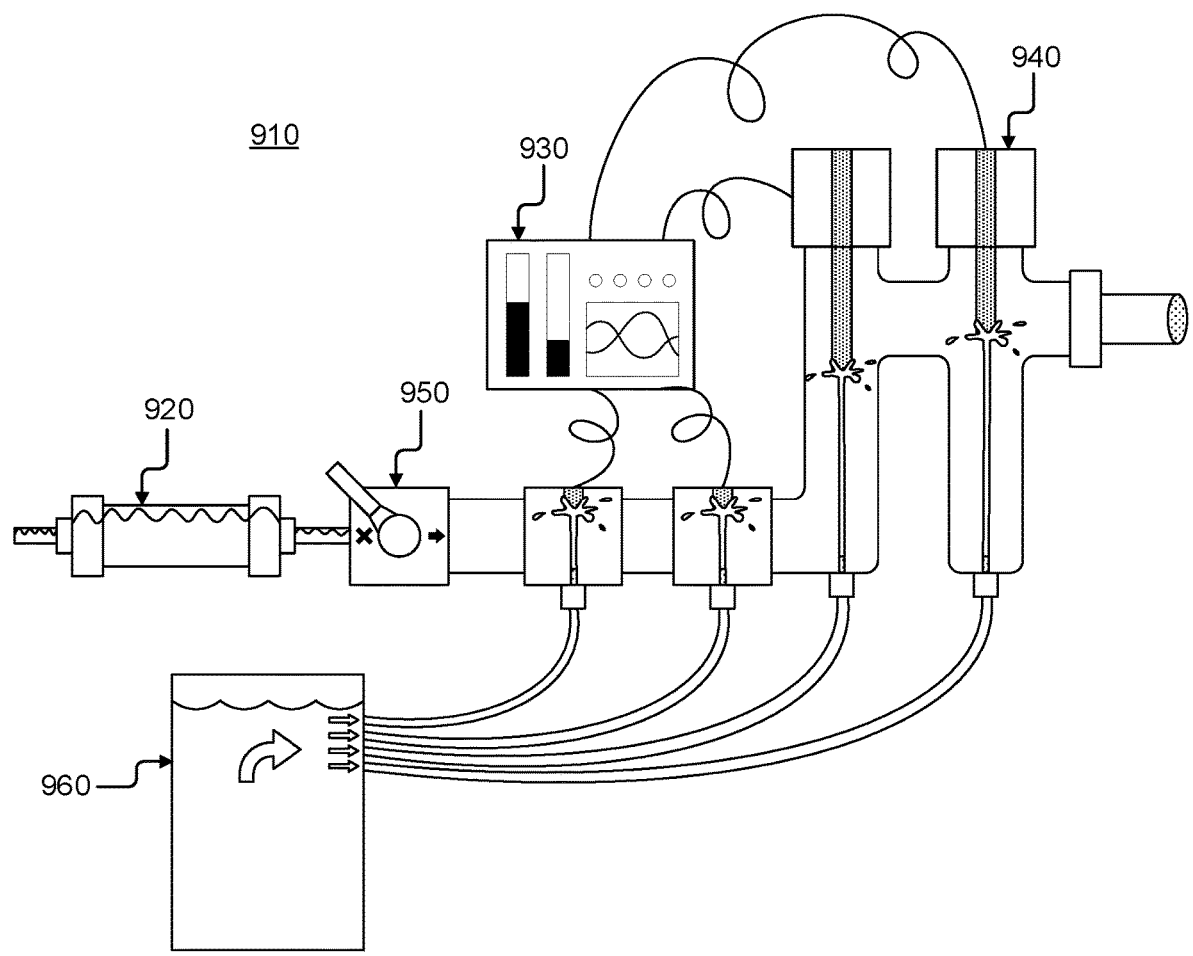
FIG. 9B illustrates an exemplary particulate removal system with self-cleaning features, wherein the particulate removal system is in a clean cycle, according to some embodiments of the present disclosure.

In some implementations, a separate water reservoir 660 may be used to flush the system out when it needs to be cleaned. In some implementations the fluid may be city water, portable water, or water, as nonlimiting examples. In some implementations, the reservoir may be connected directly to the system itself directly feeding new fluid into the system. In some implementations, the reservoir may only be connected through separate pipes or tubes that flush fluid into specific locations on the system, such as illustrated in FIGS. 9A and 9B. In some implementations, the fluid in the reservoir 660 may be clean, uncontaminated fluid manually filled into the reservoir. In some implementations, the fluid in the reservoir 660 may be recycled from the system once determined unharmed and free of particulate. For example, the contaminated fluid may be removed from the system and cleaned and tested manually to determine the fluid is uncontaminated and filtered into the reservoir after determined appropriate.

In some implementations, a control panel 650 may allow for control and access to one or more a PRS, sensors, PTM, or sensor data, as non-limiting examples. In some embodiments, the control panel may display notifications about the system across the screen of the control panel. In some implementations, a control panel 650 may transmit notifications about at least a portion of a PRS, such through audio alerts, visual alerts, or combinations. In some implementations, a control panel 650 may be detached from the system, allowing for some portability. For example, the system may be running tests which take large increments of time to complete and there may be no one to monitor the system, however, the control panel 650 may become detached and the system may be controlled from a distance within a facility or remotely as long as the panel is still connected to the network. In some aspects, as long as the panel is still connected to the network the system may be controlled remotely via the internet using a computer, laptop, or smart phone, as non-limiting examples.

Figure 7:
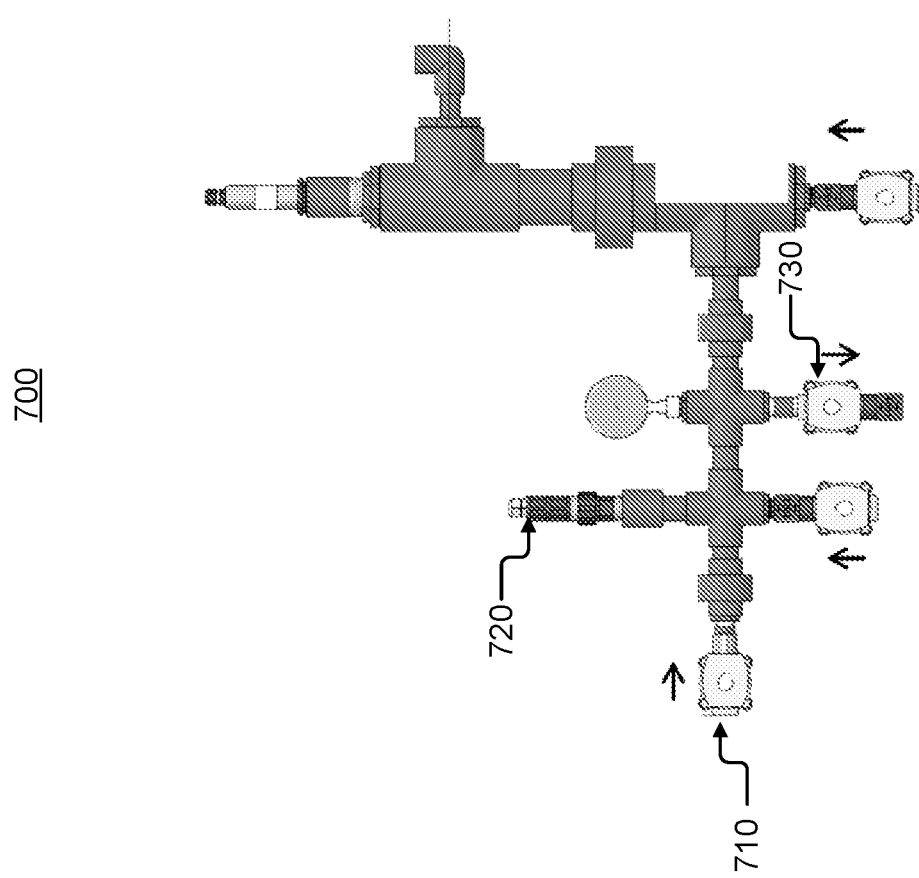
FIG. 7 illustrates an exemplary particulate removal system, according to some embodiments of the present disclosure.

Referring now to FIG. 7, an exemplary PRS 700 is illustrated. In some implementations, multiple variations of the fluid actuators 710 may be used on the PRS 700. In some implementations, an intake fluid actuator 710 may control the flow of the fluid coming in and out of the PRS 700. In some aspects, a PRS 700 may comprise secondary fluid actuators 730 that may inject cleaner fluid into the system during cleaning cycles. In some embodiments, the different variations of the fluid actuators 710, 730 may be used simultaneously on the same PRS 700. In some instances, the different fluid actuators 710, 730 may be used separately on the same PRS 700. For example, as an intake fluid actuator 710 is closed, the secondary fluid actuators 730 may open for a cleaning cycle. As another example, each actuator 710, 730 may be independently operated.

In some implementations, the fluid actuators 710 may save energy and allow the system to operate more efficiently when they are toggled off in specific instances. In some embodiments, the sensors 720 on the PRS 700 may indicate the amount of fluid in each location of the system and identify pressures, inconsistencies, and other non-limiting factors. In some implementations, the sensors 720 may indicate when they are malfunctioning and need to be repaired or replaced. In some implementations, the sensors 720 may need to be replaced manually by the user. In some implementations, the sensors 720 may have the ability to self-diagnose the issue and notify the user how to resolve the issue.

Figure 8A:
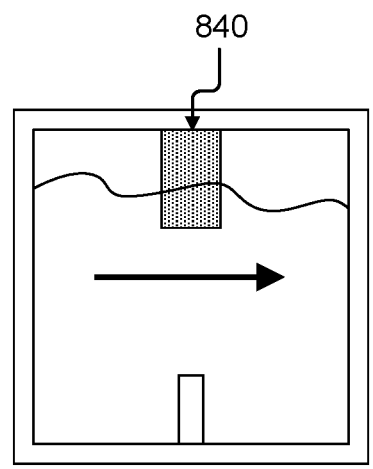
FIG. 8A illustrates an exemplary sensor in a PRS, according to some embodiments of the present disclosure.
Figure 8B:
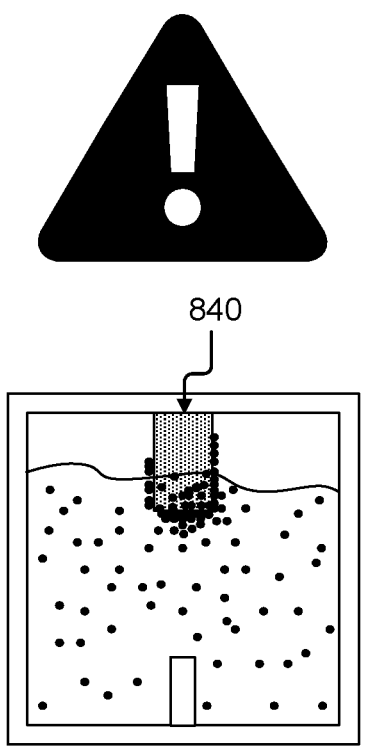
FIG. 8B illustrates an exemplary sensor in a PRS, wherein particulate may be affecting the accuracy of collected sensor data, according to some embodiments of the present disclosure.

Referring now to FIGS. 8A and 8B, an exemplary sensor 840 in a PRS is illustrated. In some aspects, a sensor 840 may comprise a probe that may extend into the flow of fluid allowing for direct measurement and monitoring of fluid quality and characteristics. In some implementations, a sensor or sensors may monitor particulate, chemical or additive levels or fluid. In some embodiments, the liquid may be filtered into instruments for continuous measurements and automatic addition of chemical to achieve a range or setpoint control. In some embodiments, some particulate may remain after the fluid is cleaned through a PTM.

Over time, the remaining particulate may collect on or around a sensor 840, which may limit its effectiveness. In some aspects, a clean cycle may remove any collected particulate, allowing the sensor 840 to operate normally. In some embodiments, the clean cycle may comprise spraying the sensor 840 wherein one or both the sprayed liquid and the liquid pressure may remove the particulate. In some implementations, a clean cycle may physically abrade the sensor 840. In some aspects, a clean cycle may comprise a combination of physical scraping and chemical cleansing. In some embodiments, the dissolved material may be agglomerated onto particulate material and removed effectively.

Referring now to FIGS. 9A and 9B, an exemplary PRS 910 with an integrated cleaning system is illustrated. In some implementations, individual quills may be located proximate to each sensor located in the system. In some embodiments, these quills may inject fresh liquid onto the sensors in a cleaning cycle. In some implementations, the fluid actuators 950 may control the flow of the fluid being pumped out by each quill. For example, the longer and more intense the cleaning the higher the fluid pressure may be from the fluid actuator 950.

In some aspects, a reservoir 960 may contain excess fluid that is pumped into the sensors 940 from connecting tubes that may push the fluid through the tubes using the fluid actuators 950. In some embodiments, the control panel 930 may allow for control of a cleaning cycle. In some implementations, once the sensors 940 have been rinsed clean with fluid from the reservoir they may resume normal functionality once cleaning has been complete.

In some embodiments, once the cleaning process is finished the clean fluid may be pushed back into the IFS 900 system using the fluid actuators 950 as mentioned before. In some implementations, the PTM 920 may be cleaned simultaneously by the fluid actuators 950 before the fluid is pushed back into the IFS 900. In some implementations, while the system is being cleaned the PTM 920 may be manually cleaned at the same time by the user. In some embodiments the particulate removal may have continuous direct measurements and control of the chemicals, flow rate, pressure, pH, conductivity, temperature and other parameters.

In some embodiments, the PRS 910 may operate autonomously. In some implementations, the PRS 910 may store data about typical fluid cycles and chemical levels, as non-limiting examples of fluid attributes. In some aspects, the PRS 910 may utilize machine learning to automatically adjust fluid attributes during use. In some embodiments, the PRS 910 may detect when the fluid exceeds predefined thresholds and automatically brings the IFS 900 within the threshold tolerance levels. In some implementations, the PRS 910 may monitor predetermined thresholds continuously during use of the IFS 900 and activate automated protocol when thresholds are exceeded.

As an illustrative example, the PRS 910 may notice the salinity of the IFS 900 is too high, the sensors are giving levels that exceed accuracy tolerance levels, and the medium in the PTM 920 is saturated with byproduct from the IFS 900. The PRS 910 may calculate the required fluid level reduction to ensure that fresh water lowers salinity levels to meet the predefined threshold. The PRS 910 may utilize an internal cleaning system to improve sensor accuracy. The PRS 910 may repeat the cleaning cycle when the readings continue to display inaccuracies exceeding predetermined tolerances. The PRS 910 may activate a fluid actuator to reduce flow through the PTM 920 sufficient to use mechanical automation to replace the saturated PTM 920 medium.

Figure 10:
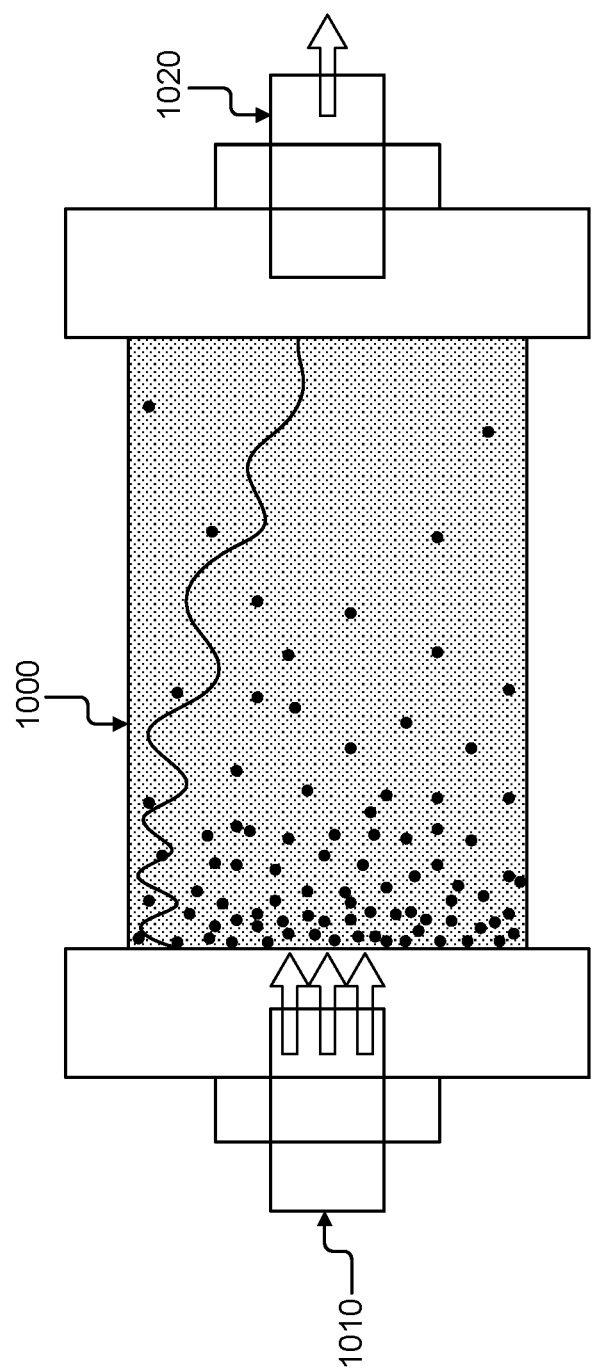
FIG. 10 illustrates fluid flow through an exemplary particulate trap mechanism, according to some embodiments of the present disclosure.

Referring now to FIG. 10, an exemplary PTM 1000 is illustrated. In some implementations, the particulate-filled fluid may flow from the IFS 1010 pipe into the PTM 1000 in which the media located inside breaks and separates the particulate from the fluid. In some embodiments, once the particulate is separated from the fluid, it may settle within the media of the PTM 1000 and filter out a different way than the clean fluid going into the PRS 1020 pipe.

In some aspects, the fluid from the IFS 1010 may enter the PTM 1000 at a much faster velocity than it may travel inside the PTM 1000. In some implementations, the fluid may be cycled through a PTM 1000 multiple times. In some embodiments, the cycling may occur through the same PTM 1000 or a series of PTMs 1000, which may have the same or different characteristics, such as diameter, media, media configuration, flow rate, and flow velocity as non-limiting examples.

Figure 11A:
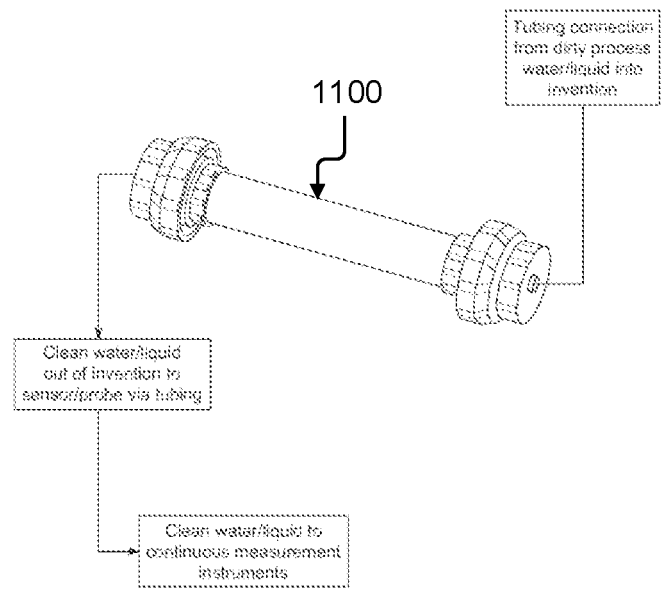
FIG. 11A illustrates an exemplary particulate trap mechanism for a particulate removal system, according to some embodiments of the present disclosure.
Figure 11B:
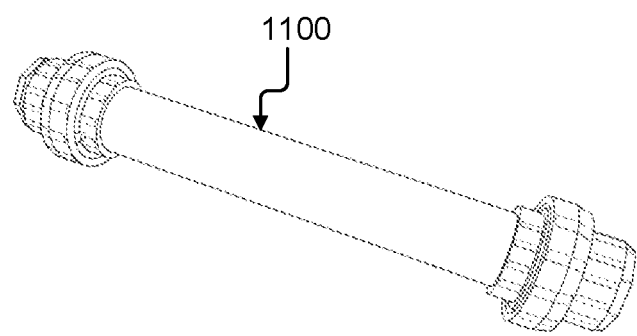
FIG. 11B illustrates an exemplary particulate trap mechanism for a particulate removal system, according to some embodiments of the present disclosure.
Figure 12A:
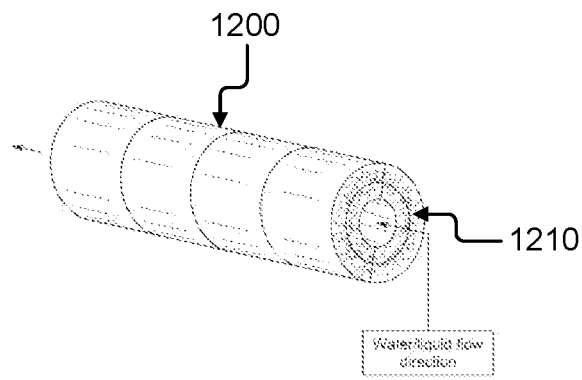
FIG. 12A illustrates a particulate trap mechanism with exemplary media, wherein the particulate trap mechanism is part of a particulate removal system, according to some embodiments of the present disclosure.
Figure 12B:
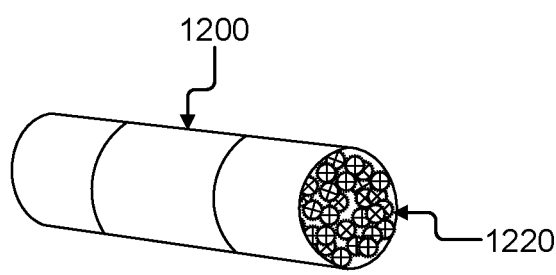
FIG. 12B illustrates a particulate trap mechanism with exemplary media, wherein the particulate trap mechanism is part of a particulate removal system, according to some embodiments of the present disclosure.
Figure 12C:
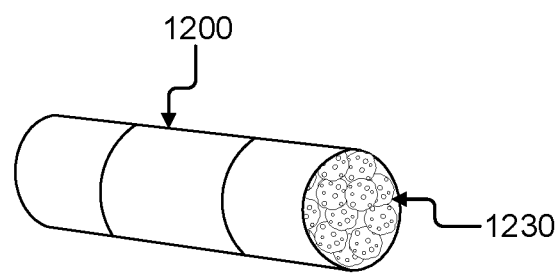
FIG. 12C illustrates a particulate trap mechanism with exemplary media, wherein the particulate trap mechanism is part of a particulate removal system, according to some embodiments of the present disclosure.
Figure 12D:
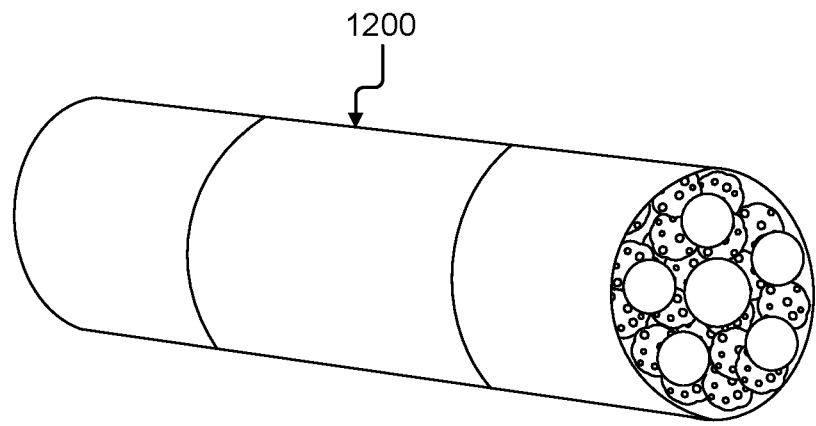
FIG. 12D illustrates a particulate trap mechanism with exemplary media, wherein the particulate trap mechanism is part of a particulate removal system, according to some embodiments of the present disclosure.

Referring now to FIGS. 11A-11B, an exemplary PTM 1100 is illustrated. In some implementations, a PTM 1100 may comprise a receiving end that may accept fluid from an IFS. In some embodiments, the fluid from the IFS may pass through the PTM 1100, wherein the PTM 1100 may remove one or more soluble material or particulate. In some implementations, the cleaned fluid may flow from the PTM 1100 back into the IFS, such as for fluid maintenance. In some aspects, the cleaned fluid may flow from the PTM 1100 through other components of a PRS, such as through sensors. In some embodiments, the PTM 1100 may be composed of porous material, aluminum, iron, copper, silicone or any other non-limiting examples. In some implementations, the PTM 1100 may need to be able to withstand high temperatures and large and sustained volumes of fluid. In some embodiments, a PTM 1100 may allow for particulate removal for continuous quality monitoring, control of chemicals, flow rate, pressure, pH conductivity, or temperature, as non-limiting examples.

Figure 13A:
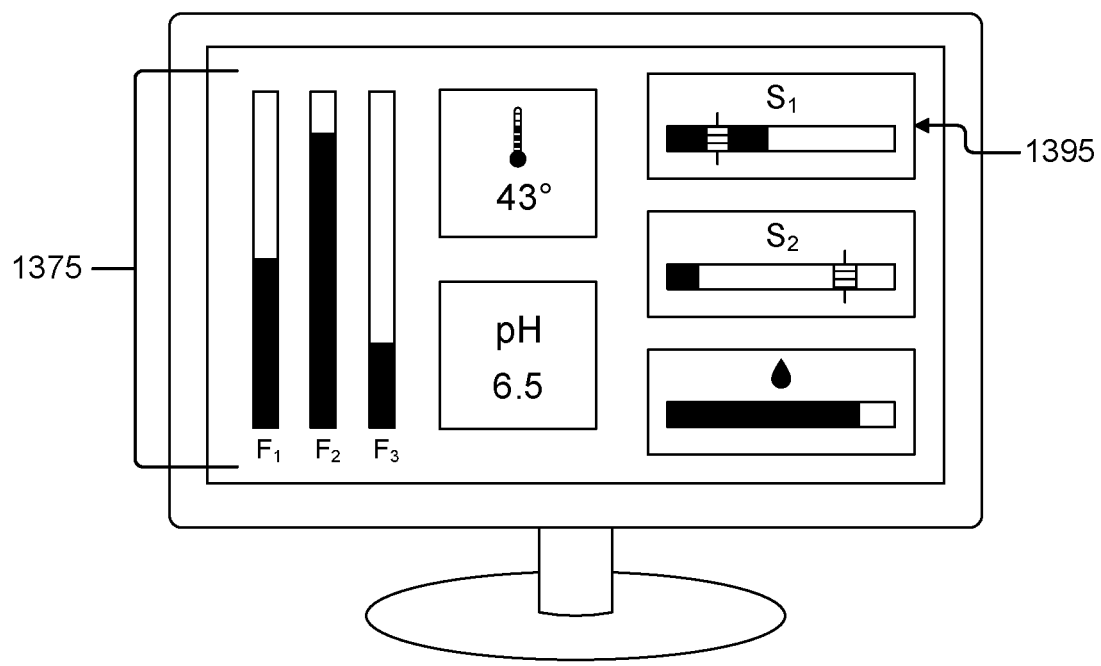
FIG. 13A illustrates an exemplary display interface of a particulate removal system, according to some embodiments of the present disclosure.
Figure 13B:
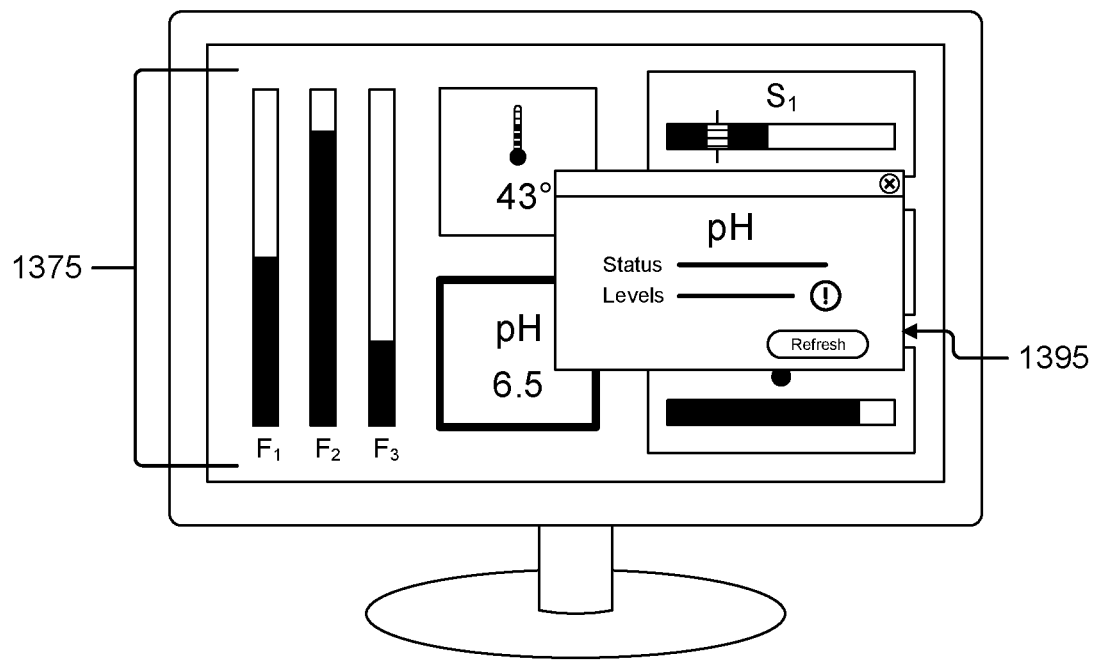
FIG. 13B illustrates an exemplary display interface of a particulate removal system, according to some embodiments of the present disclosure.

As an illustrative example, a combination of a PTM 1100 and iron rust may allow for the removal of salmonella from poultry processing systems. Salmonella will bond to iron rust, allowing for removal from an IFS. This may be useful in high temperature IFS, as a non-limiting example.

In some aspects, a PRS may comprise multiple PTM 1100, such as one for fluid maintenance and one for continuous fluid sampling for quality control. In some embodiments, multiple PTM 1100 may be placed in a series to allow for a multi-step removal of material, such as particulate. In some implementations, fluid from an IFS may be split into multiple PTM 1100, which may allow for the processing of a higher volume of fluid than a single PTM 1100.

In some embodiments, a sensor or sensors may monitor chemical or particulate levels of fluid at various stages in the process, such as flowing from an IFS, flowing through the PTM 1100, and flowing out of the PTM 1100. Monitoring the drop in particulate or chemical level may indicate when the PTM 1100 is no longer effective, such as may occur over time and use. In some implementations, the system may notify the user that the PTM 1100 may need to be serviced. In some aspects, if the liquid passes through the sensor or probing without any indications of remaining particulate they may be filtered back into the system. In some embodiments, the liquid may be filtered into instruments for continuous measurements and automatic addition of chemical to achieve a range or setpoint control.

Referring now to FIGS. 12A-12D, an exemplary PTM 1200 with different types of media 1210, 1220, 1230 are illustrated. In some implementations, the PTM 1200 may contain different variations of media 1210, 1220, 1230, such as depending on the particulate needed to be removed, the type of fluid, the IFS, the PTM, the sensors, or industry standards, as non-limiting examples. For example, a fluid may comprise caustic characteristics and the media may need to withstand those conditions. As another example, macro particulate may require different media than micro particulate, which may partially dissolved. In some aspects, the media 1210 may comprise scrubbing material that may line the PTM 1200 arranged in a cylindrical pattern, which may allow for better water flow through the PTM 1200.

In some implementations, a PTM 1200 may comprise a particulate removing media. In some aspects, a PTM 1200 may comprise a containing portion configured to contain the particulate removing media. In some embodiments, a PTM 1200 may comprise a fluid intake connector configured to accept fluid from an IFS 1200 into the containing portion and through the particulate removing media. In some implementations, a PTM 1200 may comprise a fluid outflow connector configured to dispense clean fluid from the containing portion to a continuous direct measurement system.

In some implementations, the pattern of the media 1210 may slow the liquid velocity down to enable the particulate to be captured for longer periods of time. In some aspects, this may also cause the particulate to change direction in the liquid allowing for the media 1210 to collect the particulate while the water flows through the PTM 1200. In some embodiments, the particulate may be broken down by the media 1210 and it may separate from the liquid entirely and be left to accumulate in the media 1210. In some implementations, the fluid quality sensors may enable chemical addition to control the levels of the desired range and setpoints. In the case of oils and similar proteins, soluble oil may be collected within the media without reduction or loss of flow as a result of the PTM mechanical design.

In some implementations, the media 1210 may comprise different materials which may include, but are not limited to, plastic, organics, porous material, aluminum, or silicone. In some embodiments, the material may depend on the product being produced by the system or the particulate removed. In some implementations, the material may depend on the usage of the system as well. For example, where the PTM 900 is integrated into a PRS for fluid maintenance, the PTM 900 may need to be able to withstand a large and sustained volume of fluid, which may require a more durable media. In some embodiments, where the PRS is used for continuous fluid sampling, the media may not filter as large of a quantity of fluid.

In some aspects, the media 1210, 1220, 1230 may be interchanged within a PTM 1200. In some embodiments, fluid may be flowed through a series of PTM 1200 that may have the same or different media 1210, 1220, 1230. Different media 1210, 1220, 1230 may allow for the removal of one or more different types of particulate materials and solubles.

In some implementations, the PTM 1220 may comprise empty pockets located on the interior of the PTM 1220 that allows for different media 1210, 1220, 1230 to be added and removed. In some aspects, the pockets on the interior of the PTM 1220 may allow for more flexibility when the PTM 1220 is in use. In some embodiments, the pockets may facilitate increased fluid flow through the PTM 1220. For example, the pockets may allow for a larger amount of liquid to pass through the PTM 1220 faster than other variations.

Referring now to FIGS. 13A-13B, an exemplary display interface 1395 is illustrated. In some aspects, the display interface 1395 may be accessed remotely using an external device. For example, the display interface 1395 may be on one machine and it may be controlled from a laptop in a different location. In some implementations, the display interface 1395 may be connected to an application system that may be controlled from an external device. In some embodiments, the readings from the sensor 1360 may be projected from the initial display interface 1395 to an external device using internet connection, Bluetooth, or NF technology, as non-limiting examples.

In some aspects, the display interface 1395 may comprise a plurality of settings that allow for aspects of the system to be controlled from different external devices. For example, the filtration system may be displayed on a computer screen controlled by a user in another room of the same building, while the temperature may be monitored by a different user in another building on a cell phone application. In some embodiments, the display interface 1395 may display an entire control panel 1375 that displays temperatures, sensor 1360 information, filters, pH levels, emergency notifications and other non-limiting examples.

In some embodiments, the PRS may operate autonomously. In some implementations, the PRS may store data about typical fluid cycles and chemical levels, as non-limiting examples of fluid attributes. In some aspects, the PRS may utilize machine learning to automatically adjust fluid attributes during use. In some embodiments, the PRS may detect when the fluid exceeds predefined thresholds and automatically brings the IFS within the threshold tolerance levels. In some implementations, the PRS may monitor predetermined thresholds continuously during use of the IFS and activate automated protocol when thresholds are exceeded.

As an illustrative example, the PRS may notice the salinity of the IFS is too high, the sensors are giving levels that exceed accuracy tolerance levels, and the medium in the PTM is saturated with byproduct from the IFS. The PRS may calculate the required fluid level reduction to ensure that fresh water lowers salinity levels to meet the predefined threshold. The PRS may utilize an internal cleaning system to improve sensor accuracy. The PRS may repeat the cleaning cycle when the readings continue to display inaccuracies exceeding predetermined tolerances. The PRS may activate a fluid actuator to reduce flow through the PTM sufficient to use mechanical automation to replace the saturated PTM medium.

Figure 14:
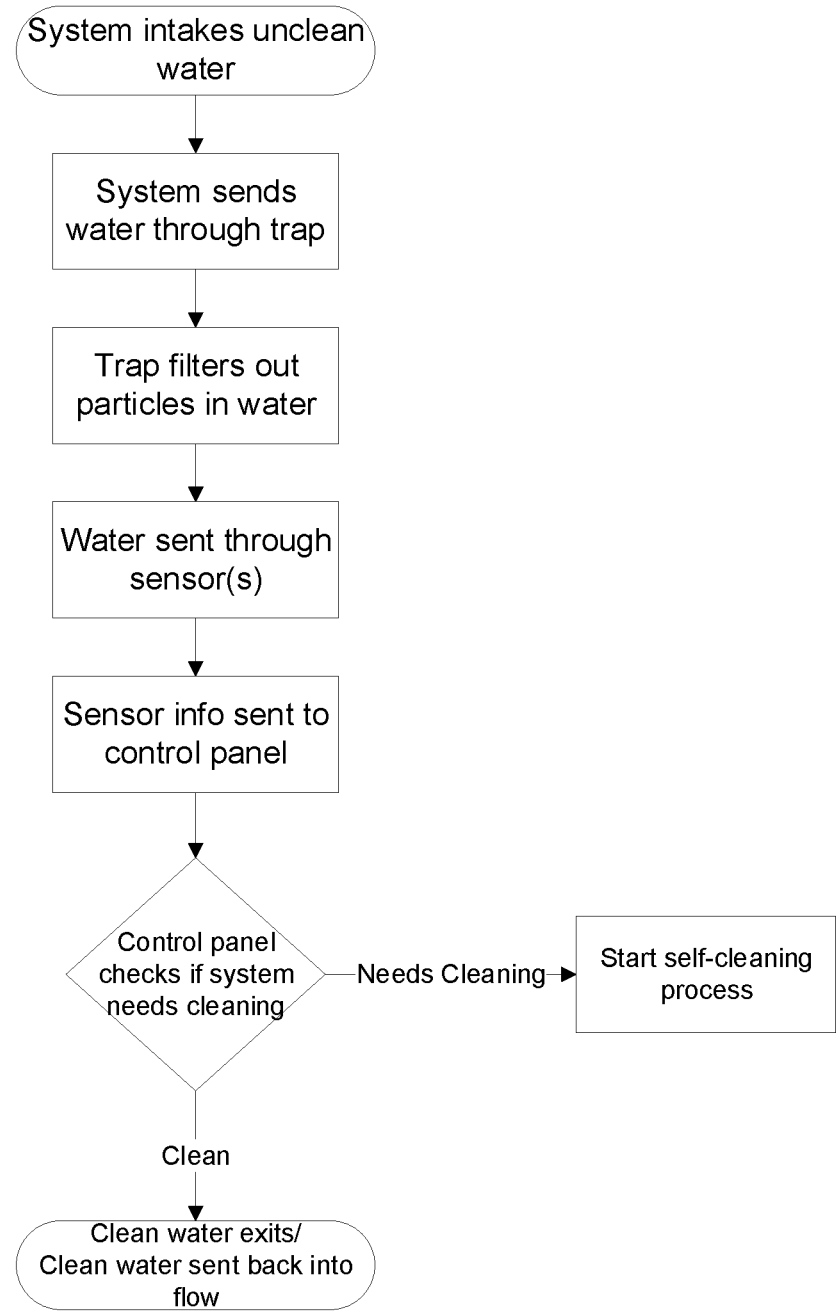
FIG. 14 illustrates an exemplary flowchart for fluid flow through a particulate removal system for continuous fluid sampling, according to some embodiments of the present disclosure.

Referring now to FIG. 14, an exemplary flowchart for fluid flow through a particulate removal system for continuous fluid sampling is illustrated. In some implementations, unfiltered fluid may enter a PRS and flow through a PTM where particulate may be removed from the fluid. After the fluid has been filtered through the PTM, it is sent through the sensors where it is checked for any remaining particulate or other fluid qualities that may be monitored, such as pressure, pH, conductivity, or peracetic acid, ASC (acidified sodium chlorite), or another chemical acid levels, as non-limiting examples.

In some implementations, if the sensors detect any remaining particulate, one or both the PRS or a user may be notified that it may need to be cleaned. The PRS may initiate a clean cycle that may remove any collected particulate throughout the system. In some aspects, the PTM may be included in the clean cycle. In some embodiments, the PTM may comprise a separate cleaning mechanism. In some implementations, the PRS may be monitored for particulate accumulation. In some aspects, the fluid may reenter the IFS.

Figure 15:
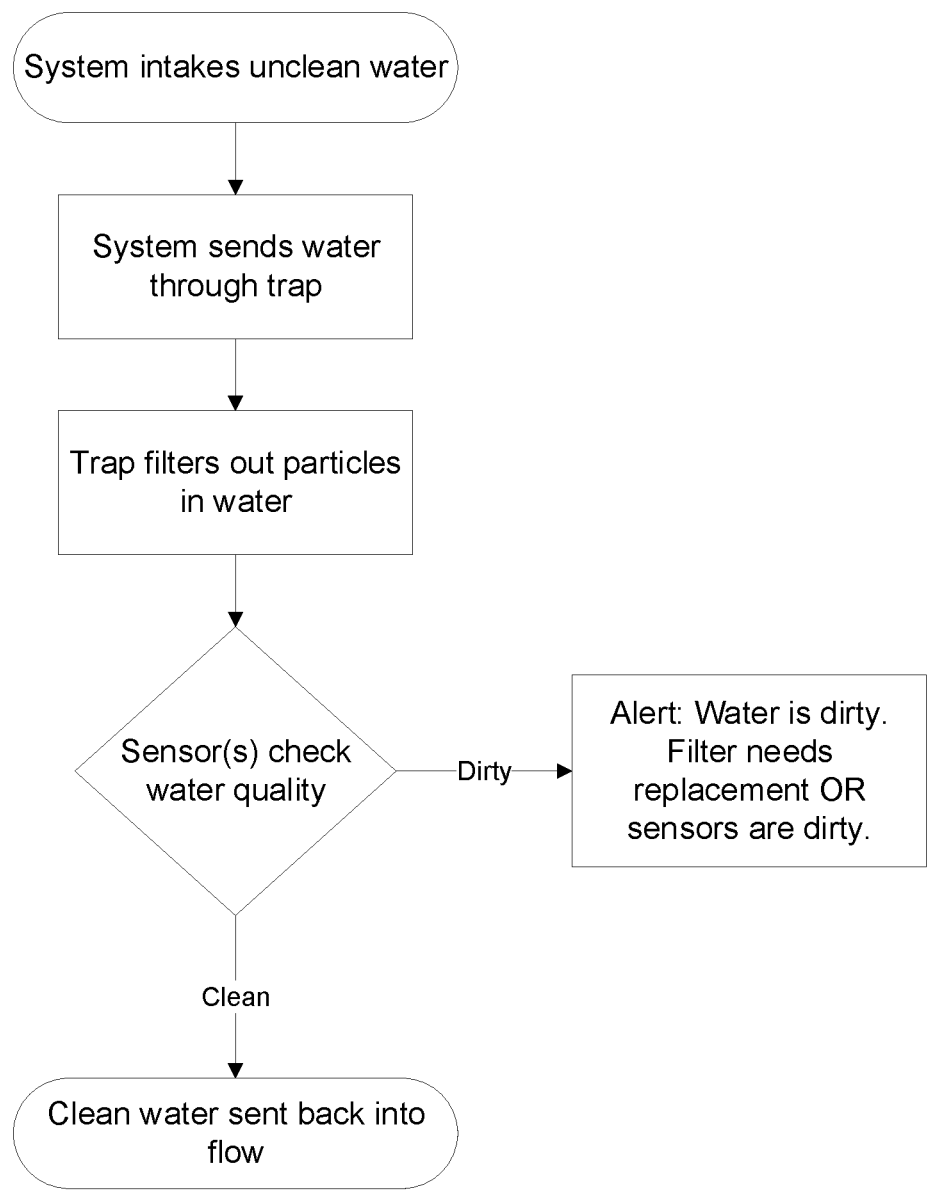
FIG. 15 illustrates an exemplary flowchart for fluid flow through a particulate removal system for fluid maintenance, according to some embodiments of the present disclosure.

Referring now to FIG. 15, an exemplary flowchart for fluid flow through a particulate removal system for fluid maintenance is illustrated. In some implementations, fluid from an IFS may be flowed through a PTM. The particulate may bel filtered out and monitored to ensure that the fluid is clean according to predefined standard. In some implementations, the sensors inside the PTM may examine the remaining water after being filtered the first time. In some implementations, the sensor may verify that the water is clean and the system may be notified. In some aspects, where the fluid may still contain excess particulate, the fluid may be flowed through another PTM or the same PTM again. This cycle may continue until the fluid attains the expected quality level. In some embodiments, clean fluid may exit the PTM and may be flowed back into the IFS. In some aspects, the fluid may be flowed through the remaining portion of the PRS.

Figure 16:
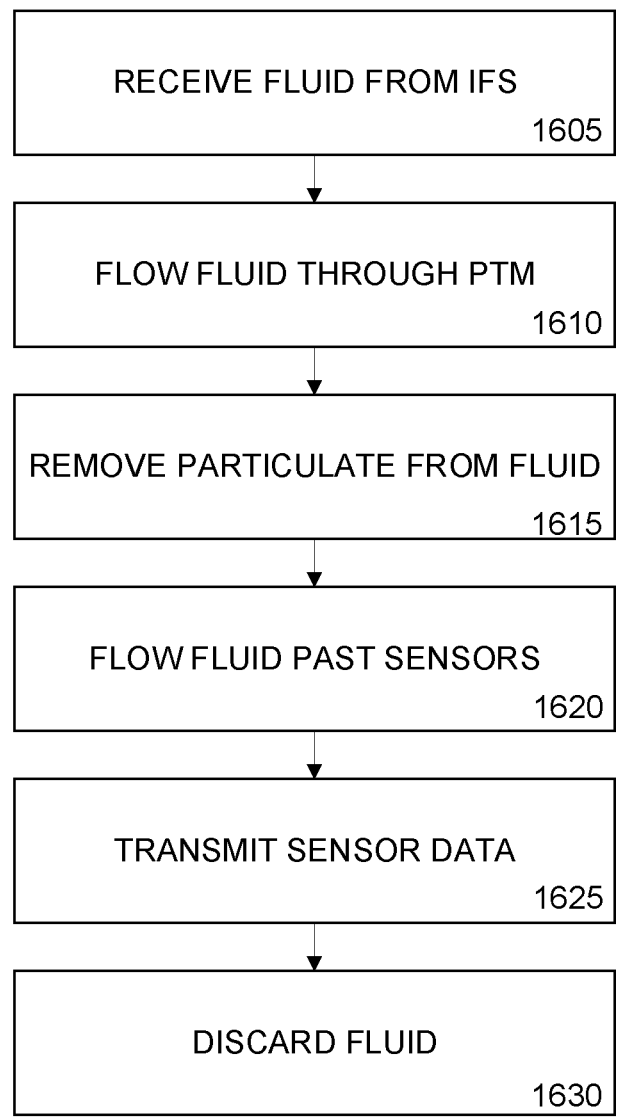
FIG. 16 illustrates exemplary method steps for removing particulate for continuous fluid sampling, according to some embodiments of the present disclosure.

Referring now to FIG. 16, exemplary method steps for removing particulate for continuous fluid sampling are illustrated. At 1650, fluid from an IFS may be received. At 1610, fluid may be flowed through a PTM. At 1615, particulate may be removed from fluid. At 1620, fluid may be flowed past sensors, wherein the flow allows for continuous fluid monitoring. At 1625, sensor data may be transmitted. At 1630, fluid may be discarded.

In some implementations, fluid from an IFS may be flowed into a PRS, which may be flowed through the PTM. In some embodiments, the PTM may filter the solids or soluble materials out of the water and begins to send it through the sensors. In some implementations, once the sensors have examined the fluid, information regarding the water is sent to the control panel. In some aspects, the clean fluid may exit the PRS once the information has been sent to the control panel and the fluid is verified clean.

Figure 17:
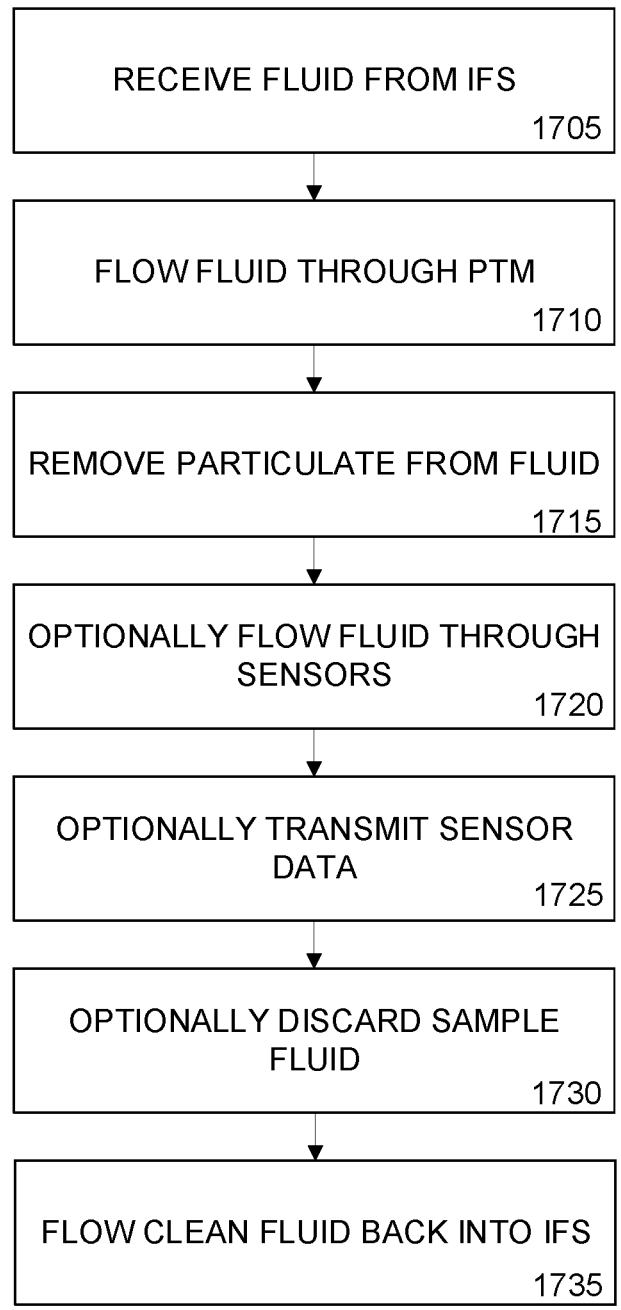
FIG. 17 illustrates exemplary method steps for removing particulate for fluid maintenance, according to some embodiments of the present disclosure.

Referring now to FIG. 17, exemplary method steps for removing particulate for fluid maintenance are illustrated. At 1705, fluid from an IFS may be received. At 1710, fluid may be flowed through a PTM. At 1715, particulate may be removed from fluid. In some embodiments, at 1720, fluid may be flowed through sensors. In some implementations, at 1725, sensor data may be transmitted. In some aspects, at 1730, sample fluid may be discarded. At 1735, clean fluid may be flowed back into the IFS.

In some implementations, fluid from an IFS may flow through a PRS, where particulate may be removed through a PTM. In some embodiments, once the fluid has entered the PTM, the media within the PTM begins filtering out the solids, dissolved solids, or soluble materials from the water and it may send the water through the sensors. In some implementations, the sensors may examine the water sent from the PTM and send the relevant information to the control panel. In some aspects, once the control panel has received the information and verifies that the water has been cleaned it is sent back into the original flow. In some embodiments, the control panel may adjust the chemical addition rates to maintain the control range and setpoint.

Figure 18:
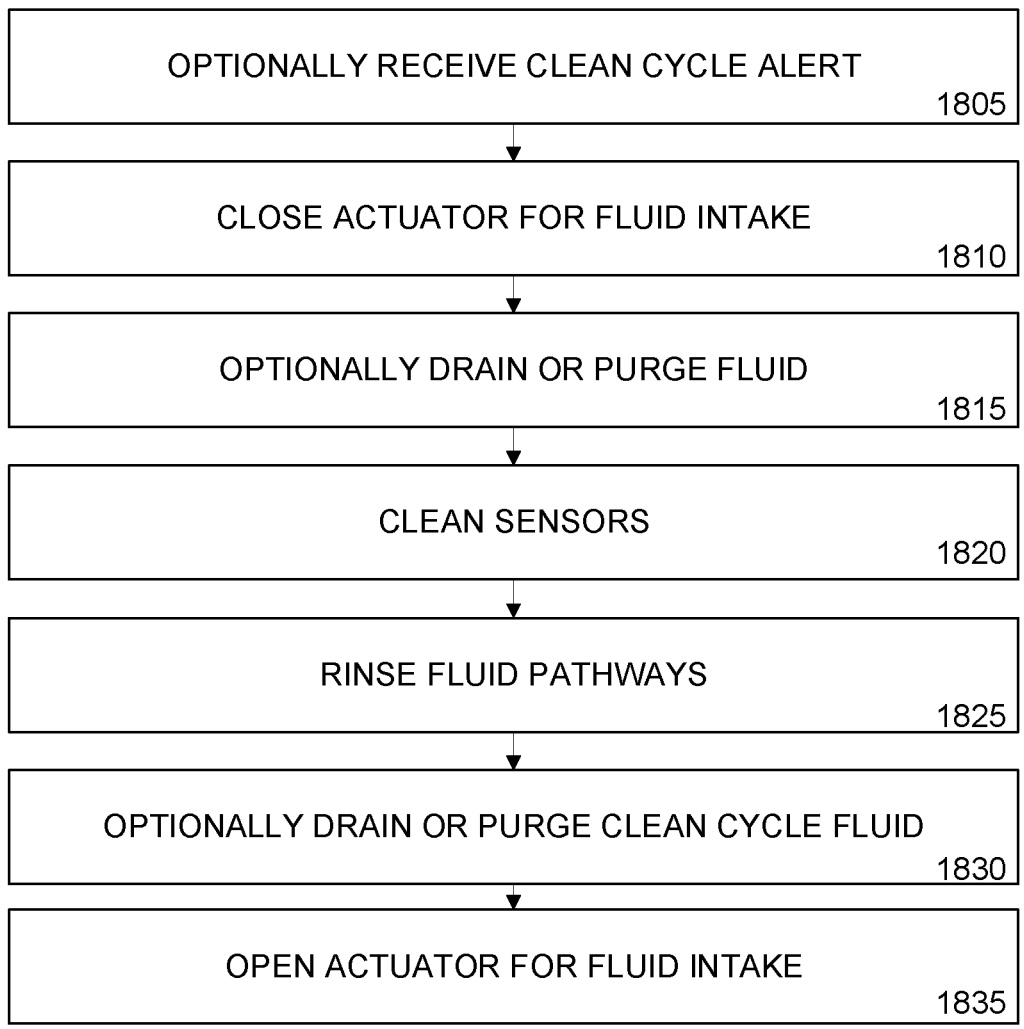
FIG. 18 illustrates exemplary method steps for removing particulate for continuous fluid sampling and fluid maintenance, according to some embodiments of the present disclosure.

Referring now to FIG. 18, exemplary method steps for removing particulate for continuous fluid sampling and fluid maintenance are illustrated. In some aspects, at 1805, a clean cycle alert may be received. At 1810, an actuator for fluid intake may be closed. In some embodiments, at 1815, fluid may be drained or purge fluid. At 1820, sensors may be cleaned, such as by spraying the sensors with fresh water. At 1825, fluid pathways may be rinsed, such as by flowing clean water from a separate supply through the PRS. In some implementations, at 1830, clean cycle fluid may be drained or purged, which may limit the risk of the clean cycle affecting sensor data after a clean cycle. At 1835, an actuator for fluid intake may be opened. In some aspects, fluid intake may prime the PRS for a predefined volume or period of time before sensor readings are monitored.

In some implementations, the system may receive a signal from the cleaning sensor notifying that a cleaning needs to occur. In some aspects, once the system has confirmed the signal, the fluid intake valve may be closed off and the remaining fluid may be drained out of the system. In some embodiments, once drained, the sensors and pipes may be rinsed with clean water from a reservoir. In some implementations, the sensors may be cleaned with a cleaning fluid, such as one that may dissolve collected fluids. In some aspects, the cleaning liquid and removed particulate may be flushed from the PRS. In some embodiments, the intake valve may be opened back up and the system may resume regular use. In some implementations, a predefined volume or duration of fluid from the IFS may be flushed through the PRS before the sensors may acquire data again, which may limit the risk of contaminated sensor data.

Figure 19:
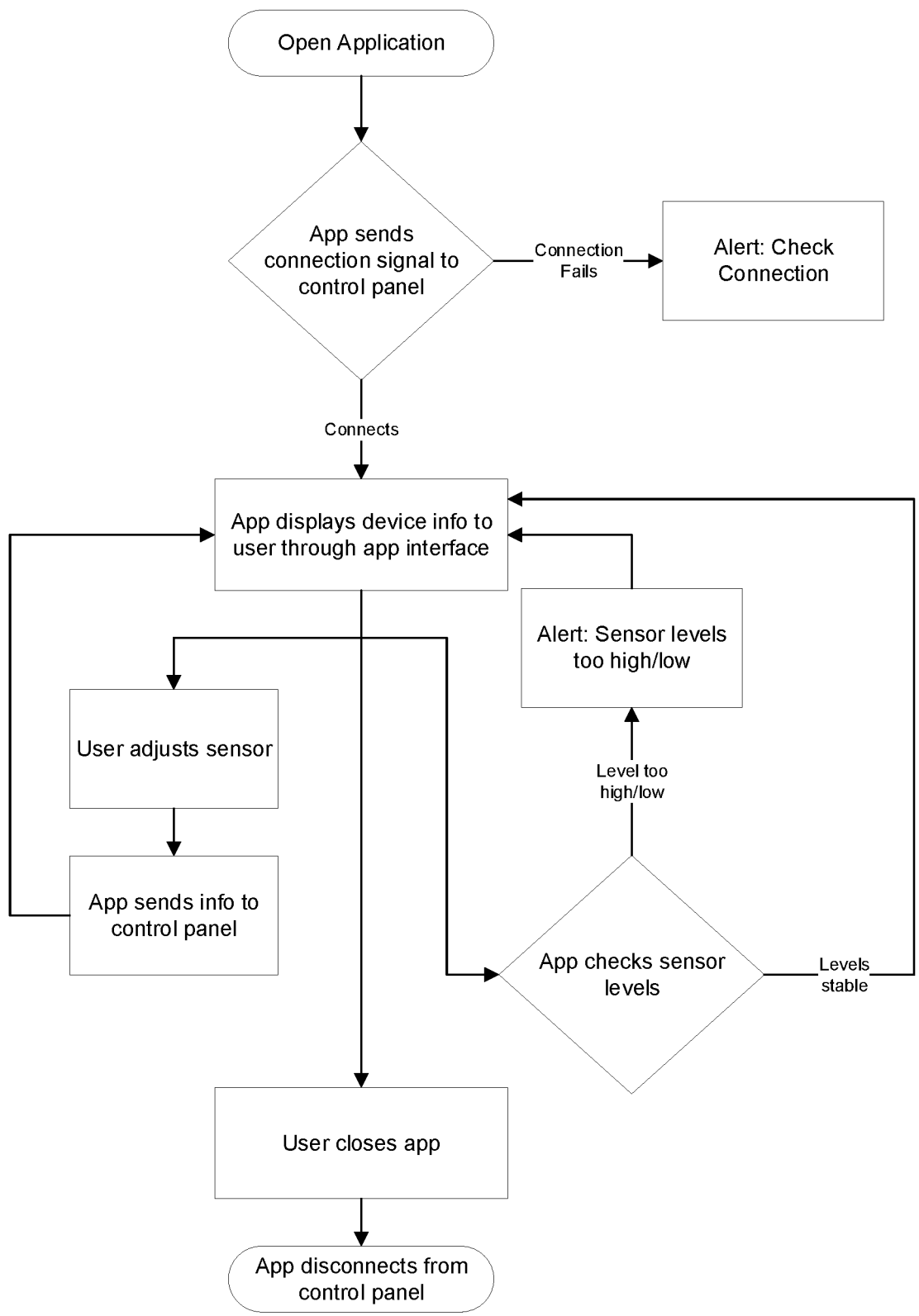
FIG. 19 illustrates an exemplary process diagram for removing particulate for remote access, according to some embodiments of the present disclosure.

Referring now to FIG. 19, an exemplary flow diagram 1900 is illustrated. The flow diagram 1900 indicates how the user may access the control panel of the system remotely. In some aspects, the flow diagram 1900 may display how the user may access the control panel through an application or program. In some implementations, the application may transmit signals to the control panel. In some aspects, the application may transmit or receive data or instructions to or from the sensors of the system.

In some implementations, the signals may relay information back to the user so that they may operate remotely. In some embodiments, the user may have preset levels for the different filters, sensors, pH levels and other non-limiting examples. In some aspects, the application may alert the user if the preset levels are too high or too low. In some embodiments, different notifications may be associated with different discrepancies.

In some aspects, the user may have the option to set the application to auto balance the levels of the control panel when a discrepancy occurs. In some implementations, the user may need a passcode to override the system if the levels need to be altered. For example, if the preset levels need to be adjusted the application may require the user to enter a passcode before changing the levels. In some embodiments, the application may record data and send it to an offline storage system. In some aspects, when a discrepancy occurs the application may take not and send the information to the storage system.

In some embodiments, the data may be observed and then a pattern may be determined to find an issue in the system. In some implementations, the user may manually adjust the levels remotely. In some aspects, the manual adjustments may be sent from the application to the control panel to implement the adjusted levels within the IFS. In some embodiments, the application may disconnect from the control panel when the application is closed.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A particulate trap mechanism comprising:
   at least one particulate removing medium, wherein each of the at least one particulate removing medium includes plastic or silicone scrubbers in a cylindrical shape with a hollow center;
   a containing portion configured to contain the at least one particulate removing medium, wherein the containing portion has a tube profile, wherein the hollow center of the at least one particulate removing medium is centered within the containing portion;
   a fluid intake connector configured to accept fluid from a fluid source into the containing portion from a first side, wherein particulate is entrained in the fluid, the fluid includes fat particulate and one or more measurable qualities, and the fluid flows through the hollow center of each of the at least one particulate removing medium, wherein the flow of fluid through the hollow center of each of the at least one particulate removing medium causes the particulate to separate into the plastic or silicone scrubbers; and
   a fluid outflow connector configured to dispense fluid from the containing portion from a second side, wherein the fluid exiting the fluid outflow connector includes a reduced amount of fat particulate and the one or more measurable qualities, wherein the one or more measurable qualities have relatively the same value at the fluid intake connector and the fluid outflow connector, and wherein the first side of the containing portion is located at an opposite end to the second side of the containing portion.

2. The particulate trap mechanism of claim 1, wherein the particulate trap mechanism is configured to remove one or more of: at least one particulate, one or more dissolved solids, or at least one soluble material from the fluid.

3. The particulate trap mechanism of claim 2, wherein removal occurs when the one or more of: the at least one particulate, the one or more dissolved solids, or the at least one soluble materials collides with the at least one particulate removing medium.

4. The particulate trap mechanism of claim 1, wherein at least a portion of the at least one particulate removing medium is removable from the particulate trap mechanism.

5. The particulate trap mechanism of claim 1, wherein at least a portion of the particulate trap mechanism comprises one or more of: at least one porous material, an amount of aluminum, an amount of iron, an amount of copper, an amount of plastic, or an amount of silicone.

6. The particulate trap mechanism of claim 1, wherein the at least one particulate removing medium is configured as a lining within an interior portion of the particulate trap mechanism.

7. The particulate trap mechanism of claim 6, wherein the at least one particulate removing medium is configured in a cylindrical pattern.

8. The particulate trap mechanism of claim 1, wherein the at least one particulate removing medium comprises an amount of silicone.

9. The particulate trap mechanism of claim 1, wherein an interior portion of the particulate trap mechanism comprises one or more pockets, wherein each of the one or more pockets is configured to at least temporarily receive at least a portion of the at least one particulate removing medium.

10. The particulate trap mechanism of claim 1, wherein the one or more measurable qualities include one or more of pH, conductivity, temperature, and chemical concentrations.

11. The particulate trap mechanism of claim 1, wherein the at least one particulate removing medium can withstand caustic conditions.

12. The particulate trap mechanism of claim 1, wherein soluble oil is collected within the at least one particulate removing medium without reduction or loss of flow of the fluid.

13. The particulate trap mechanism of claim 1, wherein the at least one particulate removing medium breaks and separates the particulate from the fluid and traps the particulate.

14. The particulate trap mechanism of claim 1, wherein the at least one particulate removing medium includes two or more particulate removing medium interspersed between each other.

* * * * *